US011966032B2

(12) United States Patent
Komatsubara et al.

(10) Patent No.: US 11,966,032 B2
(45) Date of Patent: Apr. 23, 2024

(54) VARIABLE MAGNIFICATION OPTICAL SYSTEM, OPTICAL EQUIPMENT, AND METHOD FOR PRODUCING VARIABLE MAGNIFICATION OPTICAL SYSTEM

(71) Applicant: Nikon Corporation, Tokyo (JP)

(72) Inventors: Yoko Komatsubara, Yokohama (JP); Takeshi Umeda, Fujisawa (JP)

(73) Assignee: Nikon Corporation, Tokyo (JP)

( * ) Notice: Subject to any disclaimer, the term of this patent is extended or adjusted under 35 U.S.C. 154(b) by 475 days.

(21) Appl. No.: 17/257,569

(22) PCT Filed: Jul. 13, 2018

(86) PCT No.: PCT/JP2018/026486
§ 371 (c)(1),
(2) Date: Jan. 2, 2021

(87) PCT Pub. No.: WO2020/012638
PCT Pub. Date: Jan. 16, 2020

(65) Prior Publication Data
US 2021/0278643 A1 Sep. 9, 2021

(51) Int. Cl.
*G02B 15/14* (2006.01)
*G02B 13/18* (2006.01)
(Continued)

(52) U.S. Cl.
CPC ...... *G02B 15/144511* (2019.08); *G02B 13/18* (2013.01); *G02B 15/20* (2013.01); *G02B 27/646* (2013.01); *G03B 17/14* (2013.01)

(58) Field of Classification Search
CPC ............ G02B 15/144511; G02B 13/18; G02B 15/20; G02B 27/646; G02B 27/0025; G02B 15/145511; G02B 15/1445; G03B 17/14
See application file for complete search history.

(56) References Cited

U.S. PATENT DOCUMENTS 6,163,410 A 12/2000 Nagaoka
2006/0082900 A1* 4/2006 Sugiyama ............ G02B 15/177
359/689

(Continued)

FOREIGN PATENT DOCUMENTS

JP S63-032513 A 2/1988
JP H08-029685 A 2/1996
(Continued)

OTHER PUBLICATIONS

Machine Translation of JPWO 2018/078887 A (Year: 2018).*
(Continued)

*Primary Examiner* — Darryl J Collins
*Assistant Examiner* — Matthew Y Lee
(74) *Attorney, Agent, or Firm* — Potomac Law Group, PLLC

(57) ABSTRACT

A variable magnification optical system comprises, in order from an object side, a negative first lens group, a positive second lens group, a negative third lens group and a positive fourth lens group. Upon varying a magnification, a distance between the first lens group and the second lens group, a distance between the second lens group and the third lens group, and a distance between the third lens group and the fourth lens group are varied. The first lens group consists of, in order from the object side, a negative lens and a positive lens. The second lens group consists of, in order from the object side, a positive 2a lens group, a positive 2b lens group, and a negative 2c lens group. A downsized system having high optical performance is provided.

23 Claims, 18 Drawing Sheets

(51) Int. Cl.
  *G02B 15/20* (2006.01)
  *G02B 27/64* (2006.01)
  *G03B 17/14* (2021.01)

(56) References Cited

U.S. PATENT DOCUMENTS

| | | |
|---|---|---|
| 2010/0202064 A1 | 8/2010 | Nagaoka |
| 2012/0013994 A1 | 1/2012 | Tashiro |
| 2012/0162778 A1 | 6/2012 | Imaoka |
| 2013/0027585 A1* | 1/2013 | Souma ............... G03B 5/00 348/240.1 |
| 2013/0141616 A1 | 6/2013 | Imaoka |
| 2013/0242156 A1 | 9/2013 | Amanai et al. |
| 2016/0004054 A1 | 1/2016 | Kawamura et al. |

FOREIGN PATENT DOCUMENTS

| | | |
|---|---|---|
| JP | H10-333034 A | 12/1998 |
| JP | 2006-119193 A | 5/2006 |
| JP | 2010-181787 A | 8/2010 |
| JP | 2011-059496 A | 3/2011 |
| JP | 2012-022106 A | 2/2012 |
| JP | 2012-133229 A | 7/2012 |
| JP | 2013-218256 A | 10/2013 |
| JP | 5781244 B2 | 9/2015 |
| JP | WO 2018/078887 A * | 5/2018 |
| WO | WO 2012/086153 A1 | 6/2012 |

OTHER PUBLICATIONS

Office Action dated Nov. 16, 2021, in Japanese Patent Application No. 2020-529947.
International Search Report from International Patent Application No. PCT/JP2018/026486, dated Oct. 16, 2018.
Decision of Refusal dated Apr. 5, 2022, in Japanese Patent Application No. 2020-529947.
Office Action dated Feb. 15, 2022, in Chinese Patent Application No. 201880095213.3.

* cited by examiner

Fig.2
Fig.2A
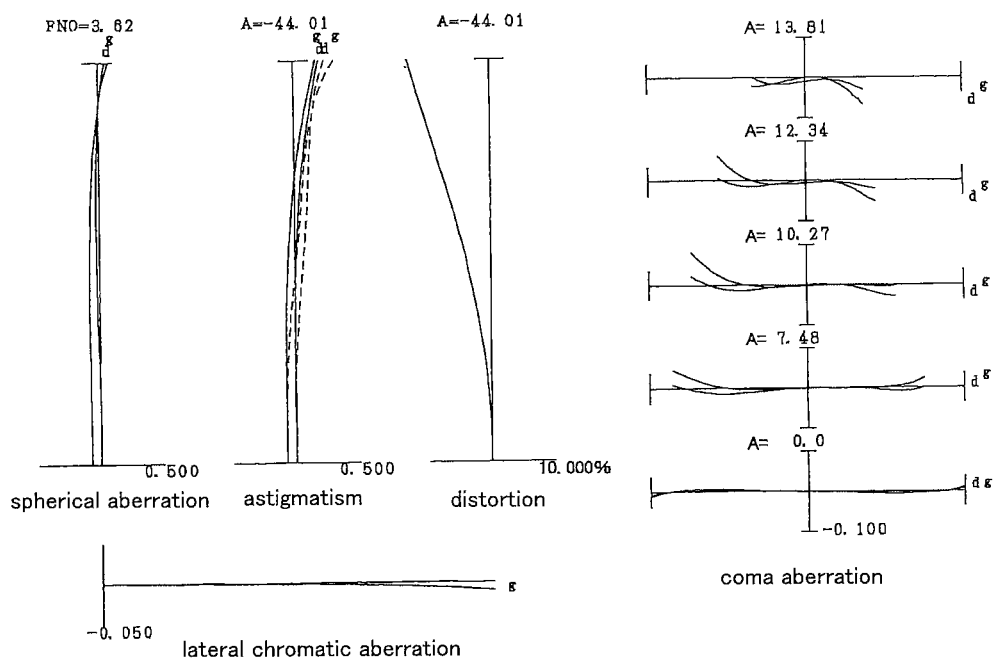
Fig.2B
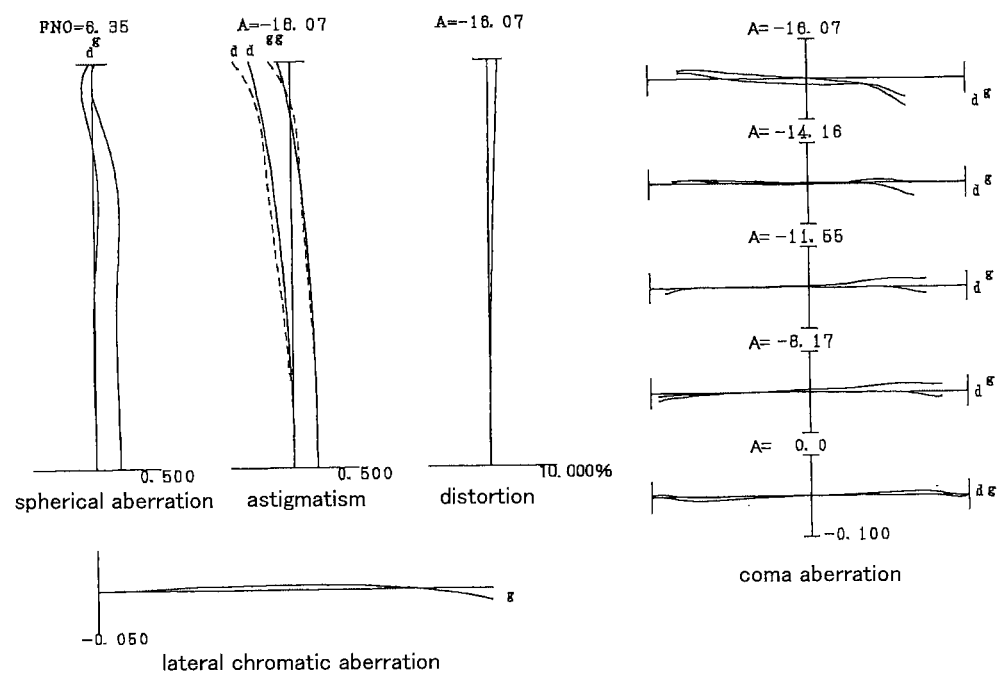

Fig.4
Fig.4A
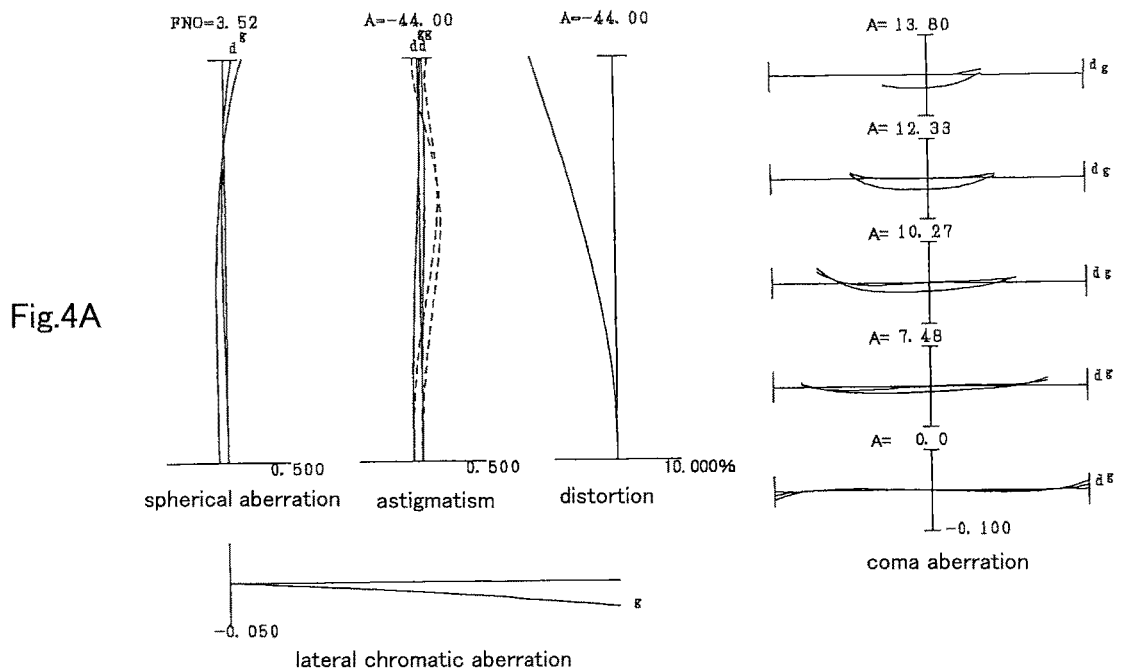
Fig.4B
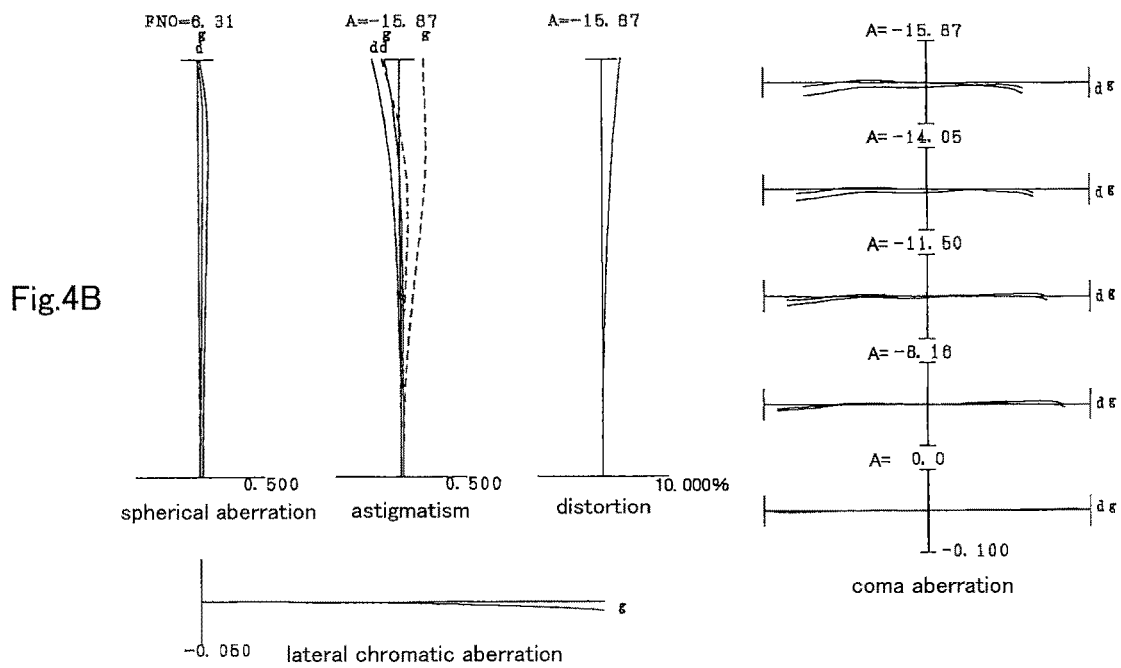

Fig.6
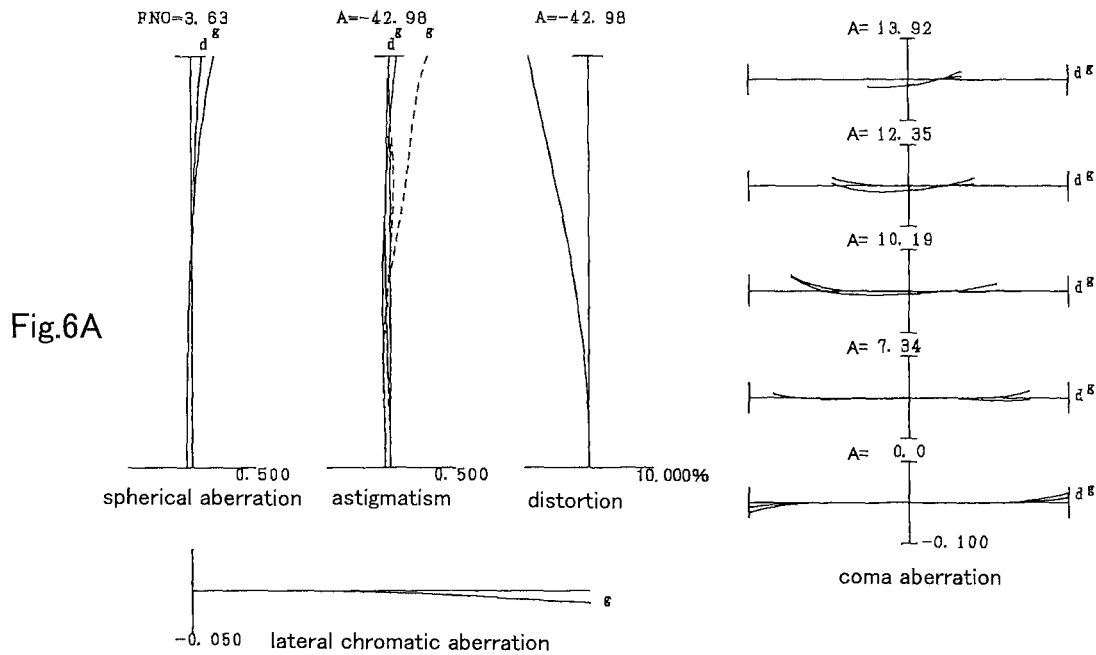
Fig.6A
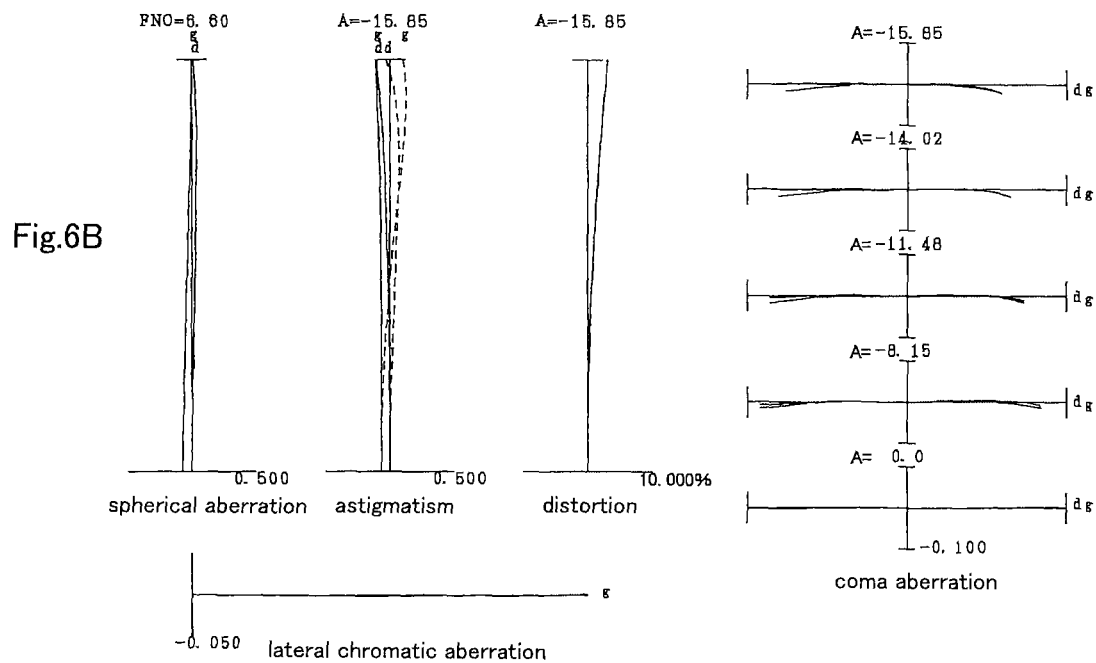
Fig.6B

Fig.8
Fig.8A
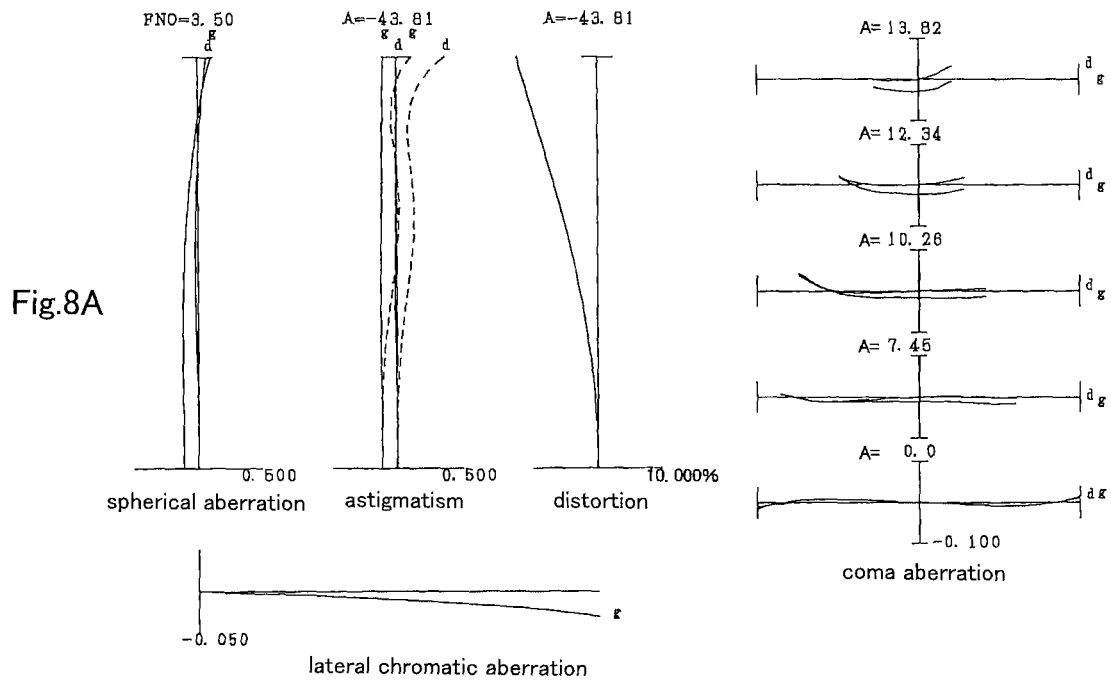
Fig.8B
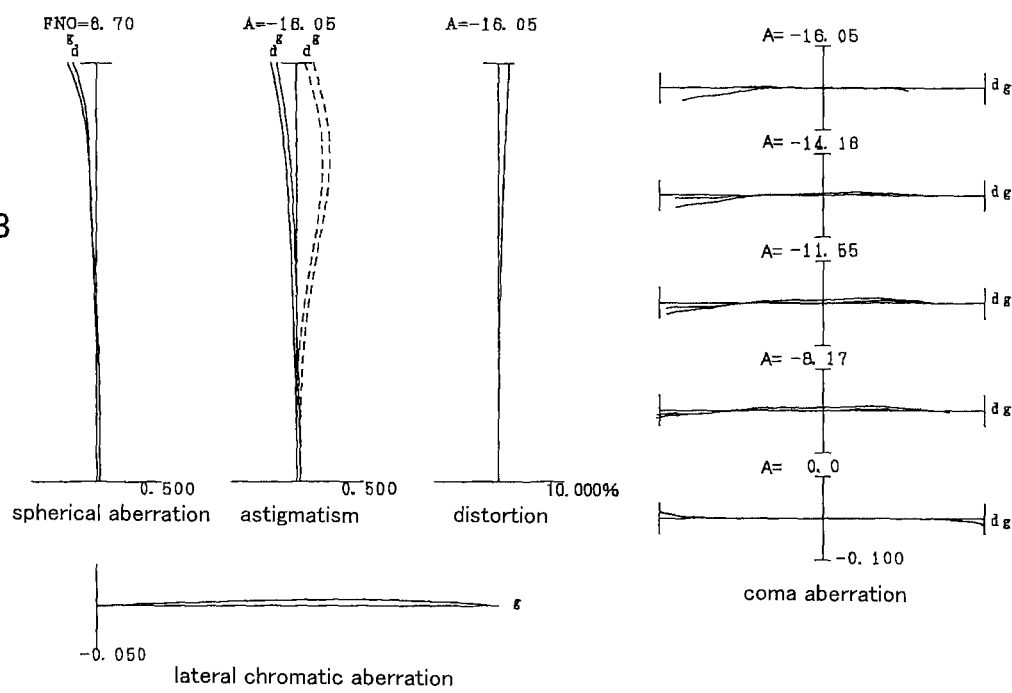

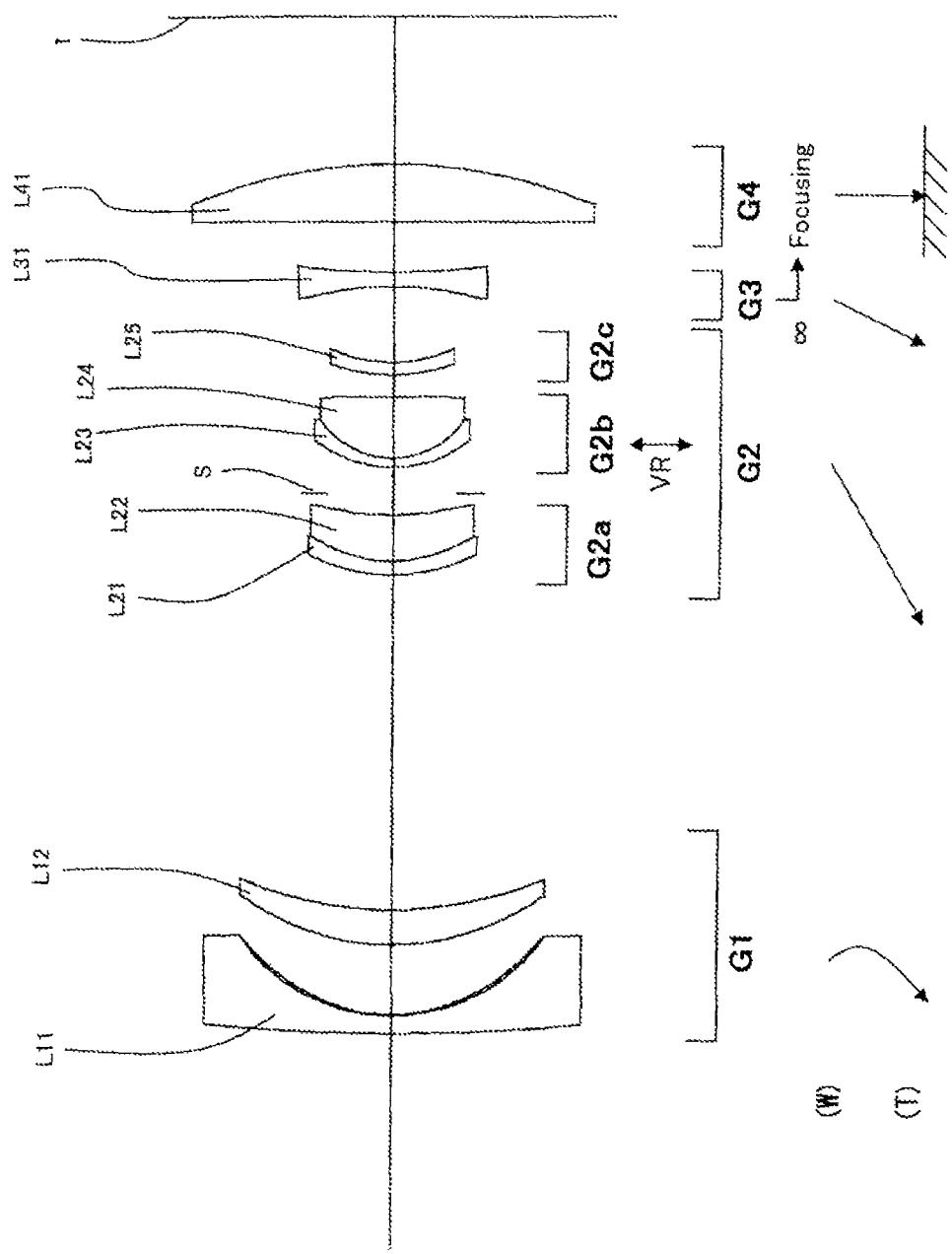

Fig.10
Fig.10A
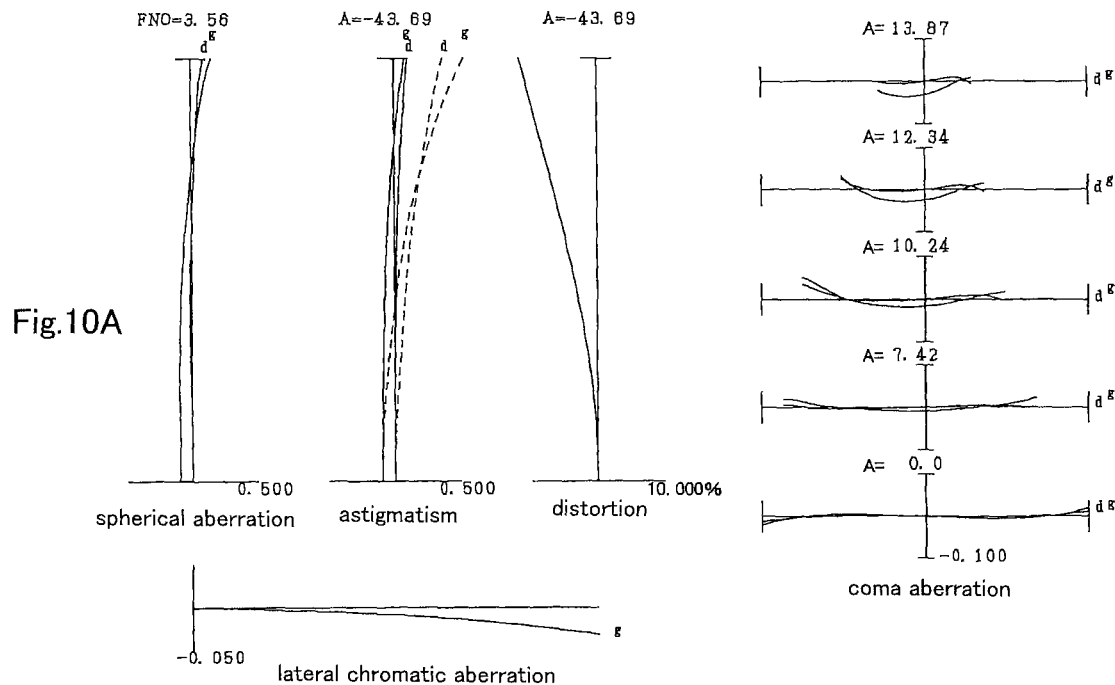
Fig.10B
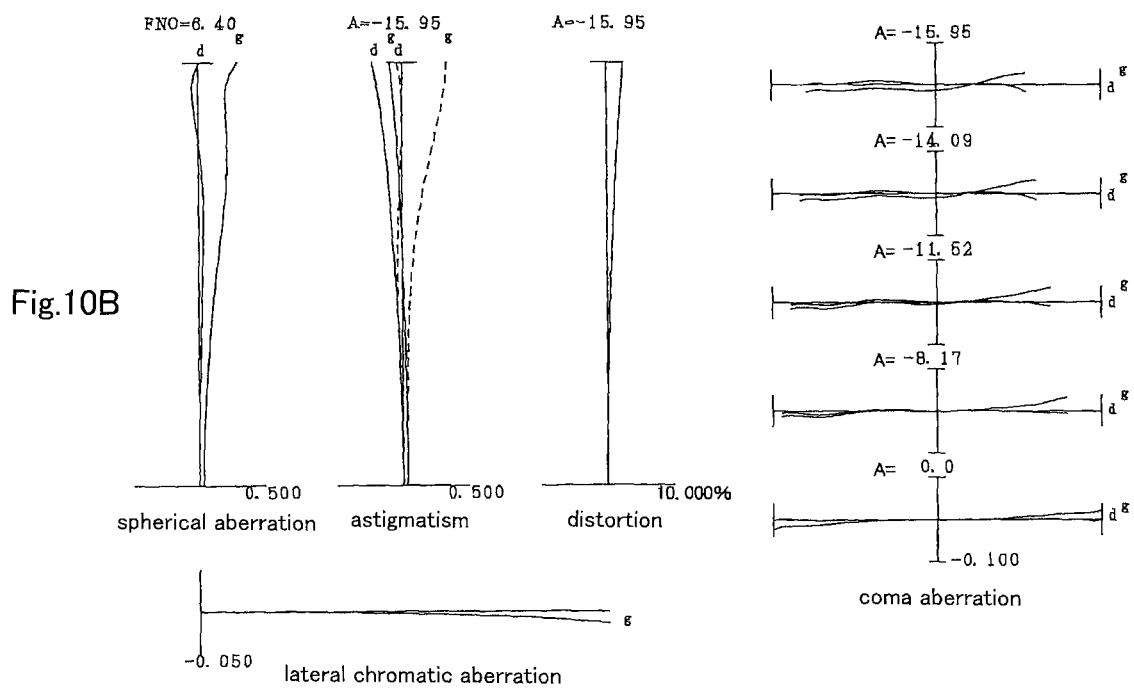

Fig.12
Fig.12A
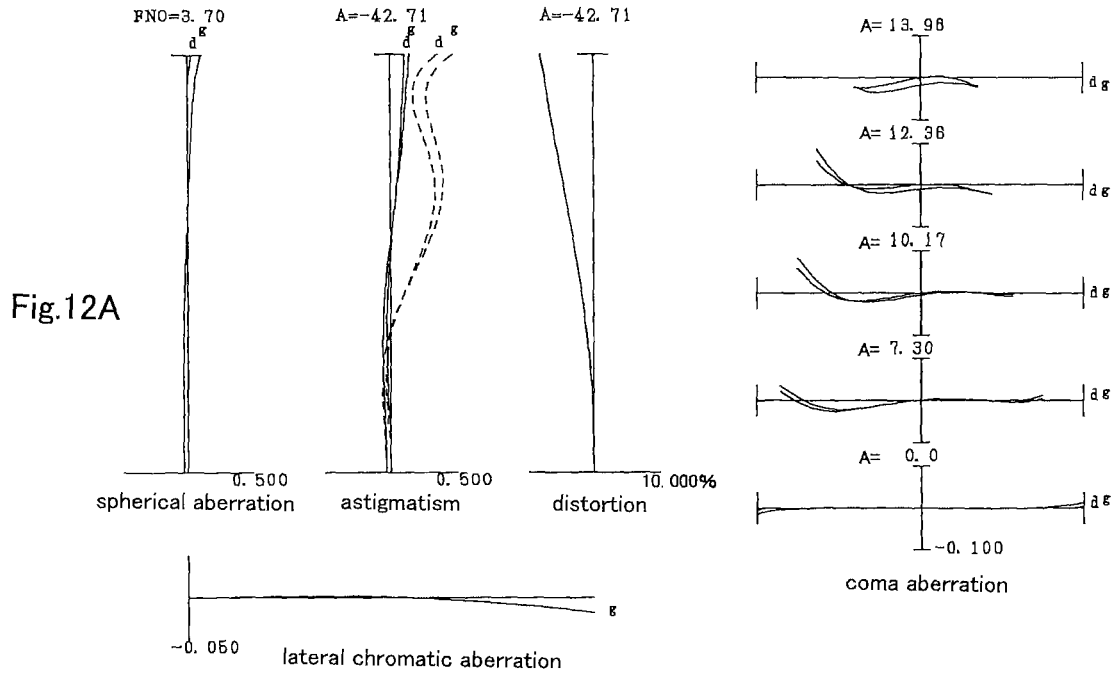
Fig.12B
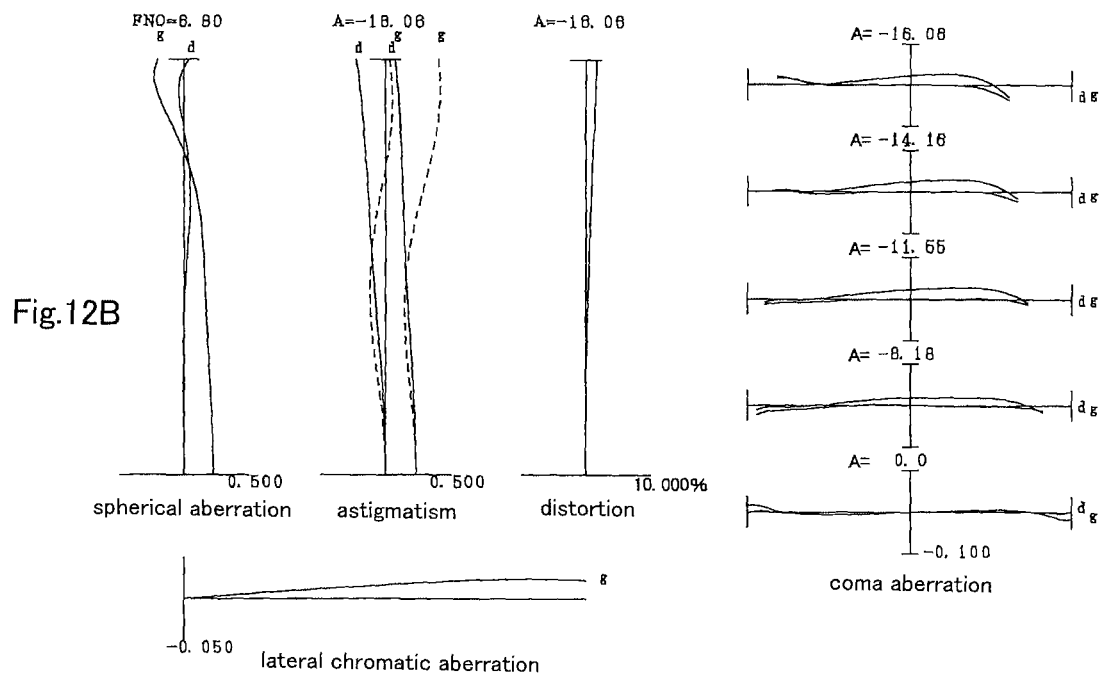

Fig.14
Fig.14A
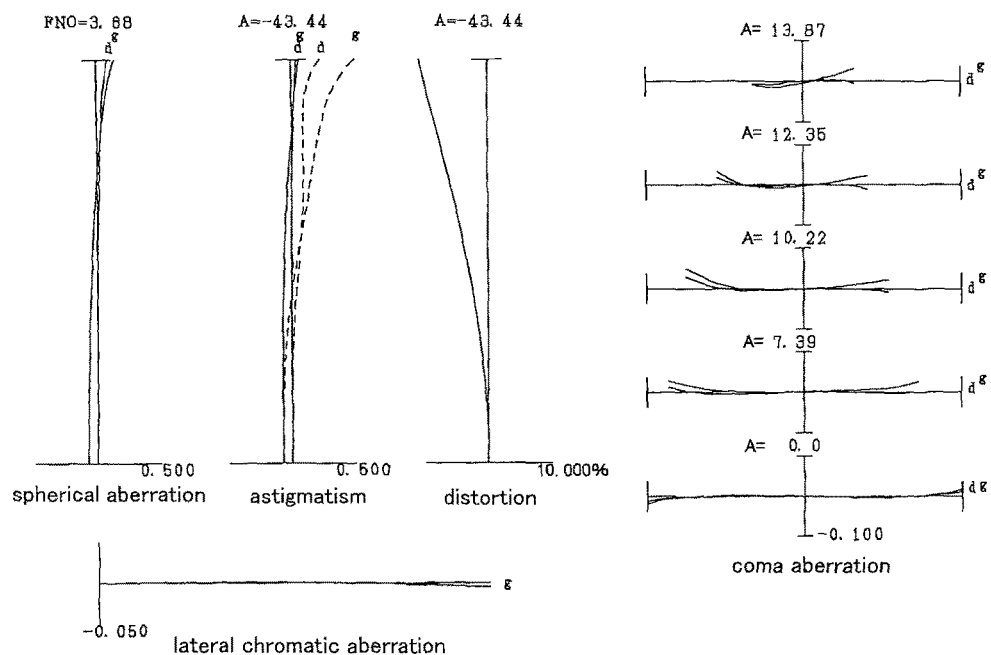
Fig.14B
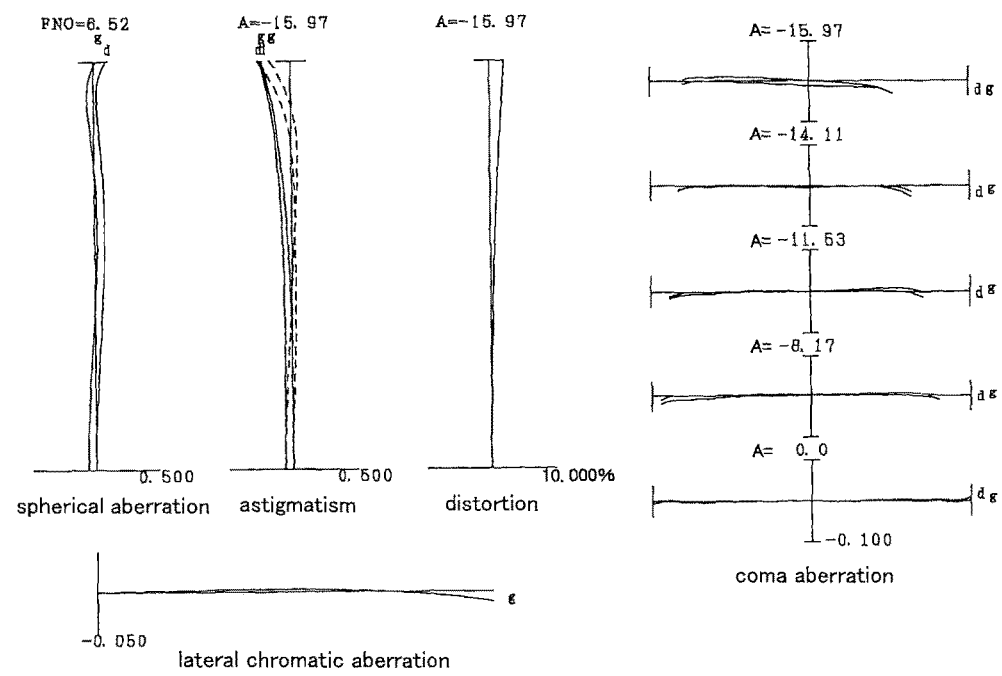

Fig.16
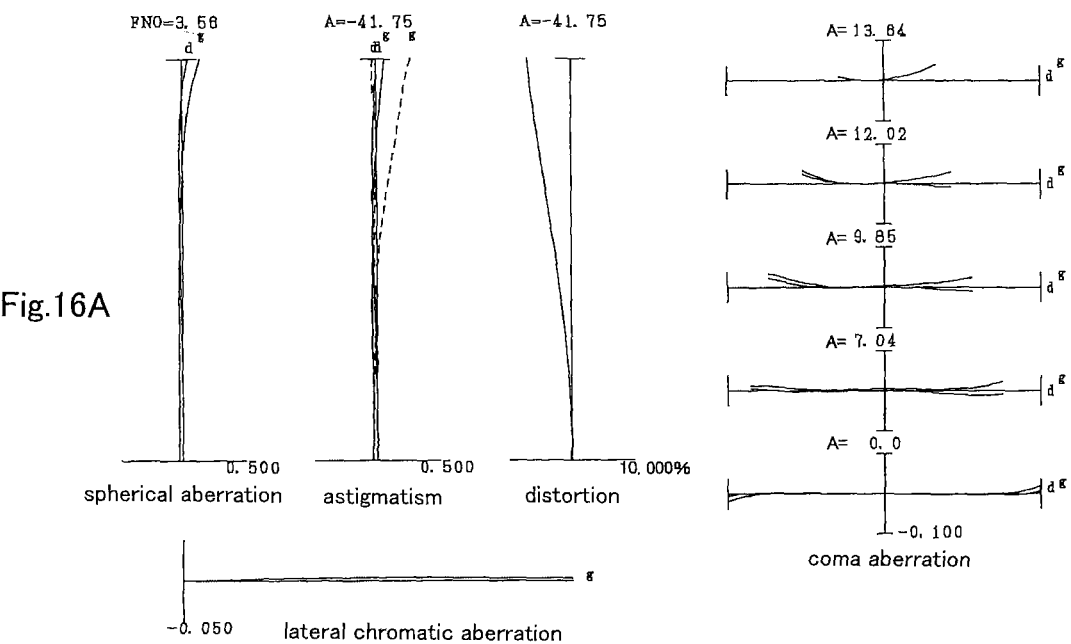
Fig.16A
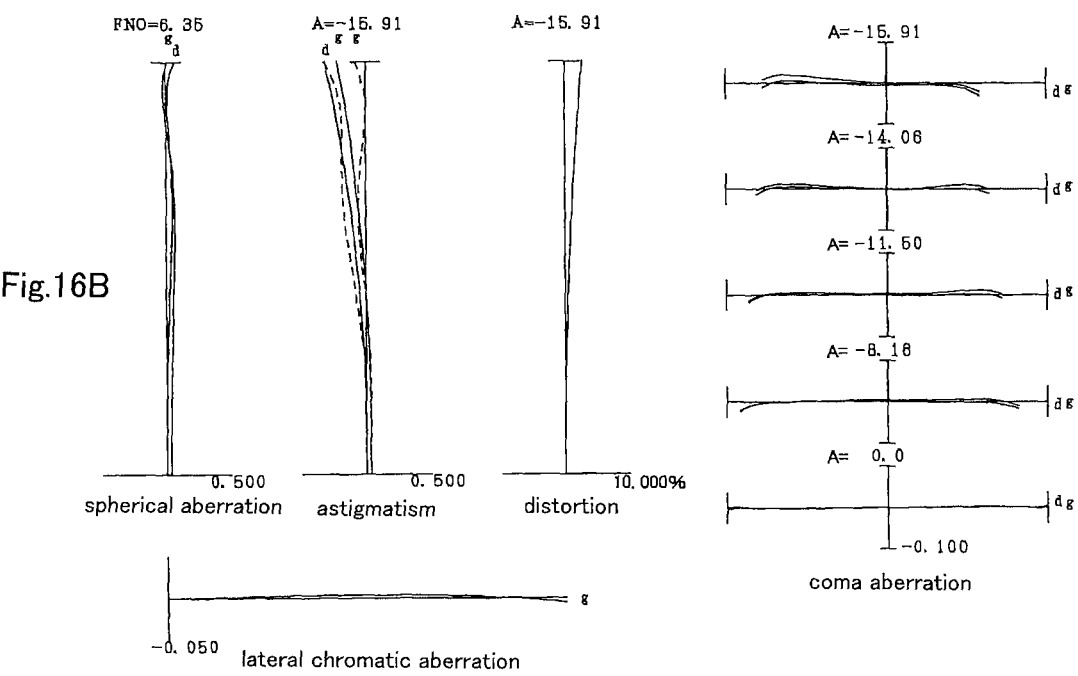
Fig.16B

VARIABLE MAGNIFICATION OPTICAL SYSTEM, OPTICAL EQUIPMENT, AND METHOD FOR PRODUCING VARIABLE MAGNIFICATION OPTICAL SYSTEM

TECHNICAL FIELD

The present invention relates to a variable magnification optical system, an optical equipment and a method for manufacturing the variable magnification optical system.

BACKGROUND ART

Conventionally, a variable magnification optical system to be used in a lens interchangeable type camera, has been intended to be made compact and improved in optical performance (for example, refer to Patent Document 1), and it is desired to be made more compact and more improved.

PRIOR ART REFERENCE

Patent Document

Patent Document 1: Japanese Patent No. 5781244

SUMMARY OF THE INVENTION

According to the present application, there is provided a variable magnification optical system comprising, in order from an object side, a first lens group having negative refractive power, a second lens group having positive refractive power, a third lens group having negative refractive power and a fourth lens group having positive refractive power;
 upon varying a magnification, a distance between said first lens group and said second lens group being varied, a distance between said second lens group and said third lens group being varied, and a distance between said third lens group and said fourth lens group being varied;
 said first lens group consisting of, in order from the object side, a negative lens and a positive lens; and
 said second lens group consisting of, in order from the object side, a 2a lens group having positive refractive power, a 2b lens group having positive refractive power, and a 2c lens group having negative refractive power.

Further, according to the present application, there is provided a method for manufacturing a variable magnification optical system comprising, in order from an object side, a first lens group having negative refractive power, a second lens group having positive refractive power, a third lens group having negative refractive power and a fourth lens group having positive refractive power, comprising steps of:
 constructing such that, upon varying a magnification, a distance between said first lens group and said second lens group is varied, a distance between said second lens group and said third lens group is varied, and a distance between said third lens group and said fourth lens group is varied;
 constructing such that said first lens group consists of, in order from the object side, a negative lens and a positive lens; and
 constructing such that said second lens group consists of, in order from the object side, a 2a lens group having positive refractive power, a 2b lens group having positive refractive power, and a 2c lens group having negative refractive power.

BRIEF DESCRIPTION OF THE DRAWINGS

FIGS. 2A and 2B are graphs showing various aberrations in the wide angle end state and in a telephoto end state, respectively, of the variable magnification optical system according to the First Example.

FIGS. 4A and 4B are graphs showing various aberrations in the wide angle end state and in a telephoto end state, respectively, of the variable magnification optical system according to the Second Example.

FIGS. 6A and 6B are graphs showing various aberrations in the wide angle end state and in a telephoto end state, respectively, of the variable magnification optical system according to the Third Example.

FIGS. 8A and 8B are graphs showing various aberrations in the wide angle end state and in a telephoto end state, respectively, of the variable magnification optical system according to the Fourth Example.

FIG. 9 is a sectional view in a wide angle end state, of a variable magnification optical system according to a Fifth Example.

FIGS. 10A and 10B are graphs showing various aberrations in the wide angle end state and in a telephoto end state, respectively, of the variable magnification optical system according to the Fifth Example.

FIGS. 12A and 12B are graphs showing various aberrations in the wide angle end state and in a telephoto end state, respectively, of the variable magnification optical system according to the Sixth Example.

FIGS. 14A and 14B are graphs showing various aberrations in the wide angle end state and in a telephoto end state, respectively, of the variable magnification optical system according to the Seventh Example.

FIGS. 16A and 16B are graphs showing various aberrations in the wide angle end state and in a telephoto end state, respectively, of the variable magnification optical system according to the Eighth Example.

EMBODIMENT FOR CARRYING OUT THE INVENTION

Figure 1:
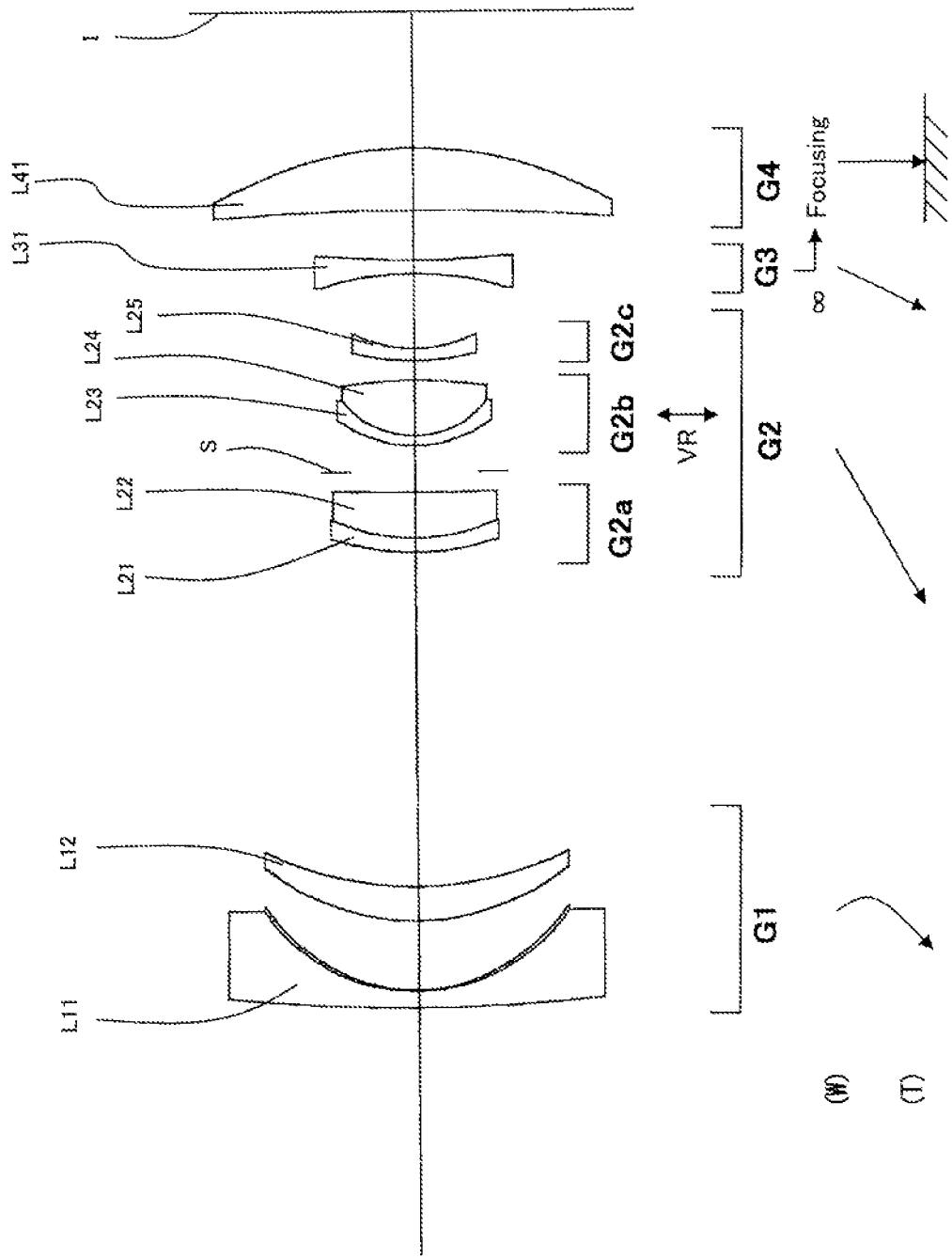
FIG. 1 is a sectional view in a wide angle end state, of a variable magnification optical system according to a First Example.

Next, a variable magnification optical system according to the present embodiment, an optical equipment and a method for producing the variable magnification optical system, will be explained.

The variable magnification optical system according to the present embodiment comprising, in order from an object side, a first lens group having negative refractive power, a second lens group having positive refractive power, a third lens group having negative refractive power and a fourth lens group having positive refractive power;

upon varying a magnification, a distance between said first lens group and said second lens group being varied, a distance between said second lens group and said third lens group being varied, and a distance between said third lens group and said fourth lens group being varied;

said first lens group consisting of, in order from the object side, a negative lens and a positive lens; and said second lens group consisting of, in order from the object side, a 2a lens group having positive refractive power, a 2b lens group having positive refractive power, and a 2c lens group having negative refractive power.

The variable magnification optical system according to the present embodiment having such a configuration can attain high optical performance realizing variable magnification and correct superbly various magnifications, and can be made compact.

It is desirable that the variable magnification optical system according to the present embodiment corrects image blur by moving the 2b lens group to have a component in a direction perpendicular to the optical axis. According to this, it is possible to suppress the image blur due to camera shake to the lowest level. Further, the 2a lens group disposed in front of the 2b lens group and the 2c lens group disposed at the back of the 2b lens group can correct superbly eccentric coma and other various affects onto marginal image generated upon correcting the image blur.

It is desirable that, in the variable magnification optical system according to the present embodiment, the third lens group is moved in the direction of the optical axis upon carrying out focusing. Thus, a drive mechanism for the third lens group that is a focusing lens group can be small-sized, and superb optical performance can be obtained from a state in which an infinitely distant object is focused to a state in which a close distant object is focused.

It is desirable that the variable magnification optical system according to the present embodiment satisfies the following conditional expression (1):

$$0.10 < f11/f1 < 1.20 \tag{1}$$

where f11 denotes a focal length of said negative lens, and f1 denotes a focal length of said first lens group.

The conditional expression (1) defines a proper ratio of the focal length of the negative lens that is an object side lens component in the first lens group relative to the focal length of the first lens group. With satisfying the conditional expression (1), the variable magnification optical system according to the present embodiment can be made compact and can correct superbly curvature of field and distortion.

When the value of f11/f1 is equal to or exceeds the upper limit of the conditional expression (1), refractive power of the negative lens that is the object side lens component in the first lens group becomes weak, so that the variable magnification optical system becomes large in size and correction of curvature of field becomes insufficient. Meanwhile, it is possible to attain the advantageous effect of the present embodiment more surely by setting the upper limit value of the conditional expression (1) to 1.10. In order to make the advantageous effect of the present embodiment more sure, it is preferable to set the upper limit value of the conditional expression (1) to 1.05, 1.00, 0.95, 0.90, 0.85, 0.80, 0.75, 0.70 and further to 0.68.

On the other hand, when the value of f11/f1 is equal to or falls below the lower limit value of the conditional expression (1), refractive power of the negative lens that is the object side lens component in the first lens group becomes strong, so that corrections of distortion and curvature of field become difficult. Meanwhile, it is possible to attain the advantageous effect of the present embodiment more surely by setting the lower limit value of the conditional expression (1) to 0.20. In order to make the advantageous effect of the present embodiment more sure, it is preferable to set the lower limit value of the conditional expression (1) to 0.25, 0.30, 0.35, 0.40, 0.45, 0.50, 0.53, 0.55, and further to 0.56.

It is desirable that the variable magnification optical system according to the present embodiment satisfies the following conditional expression (2):

$$0.50 < f12/(-f1) < 4.00 \tag{2}$$

where f12 denotes a focal length of said positive lens, and f1 denotes a focal length of said first lens group.

The conditional expression (2) defines an appropriate ratio of the focal length of said positive lens that is an image side lens component in the first lens group and the focal length of said first lens group. With satisfying the conditional expression (2), the variable magnification optical system according to the present embodiment can be made small-sized and correct superbly curvature of field and distortion.

When the value of f12/(−f1) is equal to or exceeds the upper limit value of the conditional expression (2), refractive power of the positive lens that is the image side lens component in the first lens group becomes weak, so that the variable magnification optical system becomes large in size and correction of distortion becomes insufficient. Meanwhile, it is possible to attain the advantageous effect of the present embodiment more surely by setting the upper limit value of the conditional expression (2) to 3.80. In order to make the advantageous effect of the present embodiment more sure, it is preferable to set the upper limit value of the conditional expression (2) to 3.60, 3.40, 3.20, 3.00, 2.80, 2.70, 2.50 and further to 2.40.

On the other hand, when the value of f12/(−f1) is equal to or falls below the lower limit value of the conditional expression (2), refractive power of the positive lens that is the image side lens component in the first lens group becomes strong, and corrections of curvature of field and distortion become difficult. Meanwhile, it is possible to attain the advantageous effect of the present embodiment more surely by setting the lower limit value of the conditional expression (2) to 0.80. In order to make the advantageous effect of the present embodiment more sure, it is preferable to set the lower limit value of the conditional expression (2) to 1.00, 1.10, 1.20, 1.30, 1.40, 1.50, 1.60, 1.70 and further to 1.75.

In the variable magnification optical system according to the present embodiment, it is desirable that the following conditional expression (3) is satisfied:

$$0.200 < f22/ft < 1.700 \tag{3}$$

where f22 denotes a focal length of the 2b lens group, and ft denotes a focal length of the variable magnification optical system as a whole in the telephoto end state.

The conditional expression (3) defines an appropriate range on a ratio of the focal length of the 2b lens group that is a vibration reduction lens group and a focal length of the variable magnification optical system as a whole in the telephoto end state.

With satisfying the conditional expression (3), the variable magnification optical system according to the present embodiment can be made small in size and correct superbly coma aberration.

When the value of f22/ft is equal to or exceeds the upper limit value of the conditional expression (3) of the variable magnification optical system according to the present embodiment, refractive power of the 2b lens group becomes weak, and an amount of movement of the 2b lens group upon carrying out conducting vibration reduction is increased so that the lens barrel becomes large. This is not preferable in view of making the optical system small in size. Moreover, corrections of coma aberration and curvature of field become insufficient. Meanwhile, it is possible to attain the advantageous effect of the present embodiment more surely by setting the upper limit value of the conditional expression (3) to 1.680. In order to make the advantageous effect of the present embodiment more sure, it is preferable to set the upper limit value of the conditional expression (3) to 1.650, 1.630, 1.600, 1.580, 1.550, 1.530, 1.500, 1.480 and further to 1.450.

On the other hand, when the value of f22/ft in the conditional expression (3) of the variable magnification optical system according to the present embodiment, is equal to or falls below the lower limit value, refractive power of the 2b lens group becomes strong, and it becomes difficult to conduct positioning control upon carrying out vibration reduction. Further, corrections of eccentric coma as well as coma aberration become difficult. Meanwhile, it is possible to attain the advantageous effect of the present embodiment more surely by setting the lower limit of the conditional expression (3) to 0.220. In order to make the advantageous effect of the present embodiment more sure, it is preferable to set the lower limit value of the conditional expression (3) to 0.240, 0.260, 0.280, 0.300, 0.320, 0.340, 0.360, 0.380 and further to 0.400.

Further, in the variable magnification optical system according to the present embodiment, it is desirable that the following conditional expression (4) is satisfied:

$$0.150 < f21/ft < 2.000 \tag{4}$$

where f21 denotes a focal length of the 2a lens group, and ft denotes a focal length of the variable magnification optical system as a whole in the telephoto end state.

The conditional expression (4) defines an appropriate ratio of the focal length of the 2a lens group and the focal length of the variable magnification optical system as a whole in the telephoto end state. With satisfying the conditional expression (4), the variable magnification optical system according to the present embodiment can correct superbly spherical aberration and coma aberration.

When the value of f21/ft is equal to or exceeds the upper limit value of the conditional expression (4) of the variable magnification optical system according to the present embodiment, refractive power of the 2a lens group becomes weak, and it becomes difficult to correct spherical aberration and coma aberration.

Meanwhile, it is possible to attain the advantageous effect of the present embodiment more surely by setting the upper limit of the conditional expression (4) to 1.800. In order to make the advantageous effect of the present embodiment more sure, it is preferable to set the upper limit value of the conditional expression (4) to 1.500, 1.300, 1.000, 0.980, 0.950, 0.930, 0.900, 0.880, and further 0.850.

On the other hand, when the value of f21/ft in the conditional expression (4) of the variable magnification optical system according to the present embodiment, is equal to or falls below the lower limit value, refractive power of the 2a lens group becomes strong, and it becomes difficult to correct spherical aberration and coma aberration superbly. Meanwhile, it is possible to attain the advantageous effect of the present embodiment more surely by setting the lower limit of the conditional expression (4) to 0.200. In order to make the advantageous effect of the present embodiment more sure, it is preferable to set the lower limit value of the conditional expression (4) to 0.220, 0.240, 0.260, 0.280, 0.300, 0.320, 0.340, 0.350, and furthermore to 0.360.

Further, in the variable magnification optical system according to the present embodiment, it is desirable that the 2a lens group consists of a cemented lens. With this configuration, the variable magnification optical system according to the present embodiment can correct superbly chromatic aberration. In particular, arranging the 2a lens group in the second lens group in the neighborhood of the aperture stop is effective to correct longitudinal chromatic aberration.

Further, in the variable magnification optical system according to the present embodiment, it is desirable that the 2b lens group consists of a cemented lens. With this configuration, the variable magnification optical system according to the present embodiment can correct superbly chromatic aberration. In particular, arranging the 2b lens group in the second lens group in the neighborhood of the aperture stop is effective to correct longitudinal chromatic aberration.

In the variable magnification optical system according to the present embodiment, it is desirable that the third lens group is moved in the direction of the optical axis, upon varying magnification, and the following conditional expression (5) is satisfied:

$$1.00 < (-f\gamma w) < 2.00 \tag{5}$$

where fγw denotes a ratio of an amount of movement of the image plane to an amount of movement of the third lens group at the wide angle end state.

The conditional expression (5) defines the ratio of the amount of movement of the image plane to the amount of movement of the third lens group that is a focusing lens group at the wide angle end state. With satisfying the conditional expression (5), the variable magnification optical system according to the present embodiment can be made small in size, while securing required focusing stroke, and further can correct superbly variation in curvature of field from the time when an infinitely distant object is focused to the time when a close distance object is focused.

When the value of (-fγw) is equal to or exceeds the upper limit value of the conditional expression (5) of the variable magnification optical system according to the present embodiment, refractive power of the third lens group that is the focusing lens group becomes strong, and positioning control of focusing becomes difficult. This is not preferable. Moreover, variation in curvature of field becomes large, and its correction becomes difficult. Meanwhile, it is possible to attain the advantageous effect of the present embodiment more surely by setting the upper limit value of the conditional expression (5) to 1.90. In order to make the advantageous effect of the present embodiment more sure, it is preferable to set the upper limit value of the conditional expression (5) to 1.80, 1.75, 1.70, 1.68, 1.65, 1.62, 1.60, 1.58, and furthermore to 1.55.

On the other hand, when the value of (−fγw) in the conditional expression (5) of the variable magnification optical system according to the present embodiment, is equal to or falls below the lower limit value, refractive power of the third lens group that is the focusing lens group becomes weak, and the amount of movement of the third lens group is increased. This in not preferable for making the variable magnification optical system small in size. Moreover, it becomes impossible to correct superbly curvature of field. Meanwhile, it is possible to attain the advantageous effect of the present embodiment more surely by setting the lower limit of the conditional expression (5) to 1.05. In order to make the advantageous effect of the present embodiment more sure, it is preferable to set the lower limit value of the conditional expression (5) to 1.10, 1.15, 1.18, 1.20, 1.21, and further to 1.22.

Further, in the variable magnification optical system according to the present embodiment, it is desirable that the following conditional expression (6) is satisfied:

$$0.05 < f21/f22 < 3.00 \qquad (6)$$

where f21 denotes a focal length of the 2a lens group, and f22 denotes a focal length of the 2b lens group.

The conditional expression (6) defines an appropriate ratio of the focal length of the 2a lens group to the focal length of the 2b lens group.

With satisfying the conditional expression (6), in the variable magnification optical system according to the present embodiment, power arrangement of the cemented lens of the 2a lens group and the cemented lens of the 2b lens group becomes appropriate, and it becomes possible to correct superbly chromatic aberration over the entire zooming range. In particular, arranging the cemented lens of the 2a lens group and the cemented lens of the 2b lens group in the second lens group in the neighborhood of the aperture stop is effective for correcting longitudinal chromatic aberration.

When the value of f21/f22 is equal to or exceeds the upper limit value of the conditional expression (6) of the variable magnification optical system according to the present embodiment, refractive power of the 2a lens group becomes weak and refractive power of the 2b lens group becomes strong. Therefore, balancing of correcting longitudinal chromatic aberration becomes not good upon varying magnification. In particular, it becomes impossible to correct superbly longitudinal chromatic aberration at the tele photo side. Meanwhile, it is possible to attain the advantageous effect of the present embodiment more surely by setting the upper limit of the conditional expression (6) to 2.70. In order to make the advantageous effect of the present embodiment more sure, it is preferable to set the upper limit value of the conditional expression (6) to 2.50, 2.20, 2.00, 1.95, 1.90, 1.85, 1.82, 1.80, and furthermore to 1.78.

On the other hand, when the value of f21/f22 in the conditional expression (6) of the variable magnification optical system according to the present embodiment, is equal to or falls below the lower limit value, refractive power of the 2a lens group becomes strong and refractive power of the 2b lens group becomes weak. Therefore, balancing of correcting longitudinal chromatic aberration becomes not good upon varying magnification. In particular, it becomes impossible to correct superbly longitudinal chromatic aberration at the wide angle side. Meanwhile, it is possible to attain the advantageous effect of the present embodiment more surely by setting the lower limit value of the conditional expression (6) to 0.08. In order to make the advantageous effect of the present embodiment more sure, it is preferable to set the lower limit value of the conditional expression (6) to 0.10, 0.13, 0.15, 0.18, 0.20, 0.23, 0.24, 0.25, and furthermore to 0.26.

Further, in the variable magnification optical system according to the present embodiment, it is desirable that the following conditional expression (7) is satisfied:

$$0.50 < (-f3)/fw < 3.00 \qquad (7)$$

where f3 denotes a focal length of the third lens group, and fw denotes a focal length of the variable magnification optical system as a whole in the wide angle end state.

The conditional expression (7) is a conditional expression that defines a ratio of the focal length of the third lens group that is a focusing lens group and a focal length of the variable magnification optical system as a whole in the telephoto end state. With satisfying the conditional expression (7), a driving mechanism or structure of the focusing lens group can be made small in size while securing required focusing stroke, and moreover variation in curvature of field can be superbly corrected from a state focusing on an infinite distance object to a state focusing on a close distance object, and in particular in a focal distance range at the wide angle side.

When the value of (−f3)/fw is equal to or exceeds the upper limit value of the conditional expression (7) of the variable magnification optical system according to the present embodiment, refractive power of the third lens group that is the focusing lens group becomes weak, and an amount of movement of the third lens group is increased. It is not preferable in view of making the optical system small in size. Moreover, correction of curvature of field becomes difficult in the focal distance range at the wide angle side. Meanwhile, it is possible to attain the advantageous effect of the present embodiment more surely by setting the upper limit of the conditional expression (7) to 2.80. In order to make the advantageous effect of the present embodiment more sure, it is preferable to set the upper limit value of the conditional expression (7) to 2.50, 2.40, 2.30, 2.20, 2.10, 2.00, 1.95, 1.90 and further to 1.85.

On the other hand, when the value of (−f3)/fw in the conditional expression (7) of the variable magnification optical system according to the present embodiment, is equal to or falls below the lower limit value, refractive power of the third lens group that is the focusing lens group becomes strong, and positioning control of the focusing lens group becomes difficult. It is not preferable. Moreover, variation in curvature of field becomes large and correction thereof becomes difficult. Meanwhile, it is possible to attain the advantageous effect of the present embodiment more surely by setting the lower limit value of the conditional expression (7) to 0.60. In order to make the advantageous effect of the present embodiment more sure, it is preferable to set the lower limit value of the conditional expression (7) to 0.70, 0.80, 0.90, 0.95, 1.00, 1.05, 1.10, 1.15, and further to 1.20.

Further, in the variable magnification optical system according to the present embodiment, it is desirable that the following conditional expression (8) is satisfied:

$$0.100 < G2/TLt < 0.500 \qquad (8)$$

where G2 denotes a length on the optical axis of the second lens group, and TLt denotes a length on the optical axis of the variable magnification optical system as a whole in the tele photo end state.

The conditional expression (8) is a conditional expression that defines an appropriate length on the optical axis of the second lens group. With satisfying the conditional expression (8), the variable magnification optical system according to the present embodiment can be made small in size and correct superbly spherical aberration and coma aberration.

When the value of G2/TLt is equal to or exceeds the upper limit value of the conditional expression (8) of the variable magnification optical system according to the present embodiment, a thickness of the second lens group becomes large. In this case, refractive power of the second lens group becomes weak, or the number of lenses composing the second lens group is increased, or the thickness of lenses composing the second lens group becomes large, so the optical system becomes large in size. This is not preferable. Meanwhile, it is possible to attain the advantageous effect of the present embodiment more surely by setting the upper limit value of the conditional expression (8) to 0.450. In order to make the advantageous effect of the present embodiment more sure, it is preferable to set the upper limit value of the conditional expression (8) to 0.400, 0.380, 0.350, 0.330, 0.300, 0.280, 0.260, 0.250, and furthermore to 0.230.

On the other hand, when the value of G2/TLt in the conditional expression (8) of the variable magnification optical system according to the present embodiment, is equal to or falls below the lower limit value, thickness of the second lens group becomes small. In this case, refractive power of the second lens group becomes strong, or the number of lenses composing the second lens group becomes decreased. As a result, it becomes impossible to correct superbly spherical aberration and coma aberration. Meanwhile, it is possible to attain the advantageous effect of the present embodiment more surely by setting the lower limit of the conditional expression (8) to 0.130. In order to make the advantageous effect of the present embodiment more sure, it is preferable to set the lower limit value of the conditional expression (8) to 0.140, 0.150, 0.160, 0.165, 0.170, 0.175, 0.180, 0.185, and furthermore to 0.190.

Further, in the variable magnification optical system according to the present embodiment, it is desirable that the following conditional expression (9) is satisfied:

$$0.020 < G4/TLt < 0.200 \quad (9)$$

where G4 denotes a length on the optical axis of the fourth lens group, and TLt denotes a length on the optical axis of the variable magnification optical system as a whole in the tele photo end state.

The conditional expression (9) is a conditional expression that defines an appropriate length on the optical axis of the fourth lens group. With satisfying the conditional expression (9), the variable magnification optical system according to the present embodiment can be made small in size and correct superbly variation in curvature of field upon varying magnification.

When the value of G4/TLt is equal to or exceeds the upper limit value of the conditional expression (9) of the variable magnification optical system according to the present embodiment, a thickness of the fourth lens group becomes large. In this case, refractive power of the fourth lens group becomes weak, or the number of lenses composing the fourth lens group is increased, or the thickness of lenses composing the fourth lens group becomes large, so the optical system becomes large in size. This is not preferable.

Meanwhile, it is possible to attain the advantageous effect of the present embodiment more surely by setting the upper limit of the conditional expression (9) to 0.180. In order to make the advantageous effect of the present embodiment more sure, it is preferable to set the upper limit value of the conditional expression (9) to 0.150, 0.130, 0.110, 0.100, 0.095, 0.092, 0.090, 0.088 and furthermore to 0.085.

On the other hand, when the value of G4/TLt in the conditional expression (9) of the variable magnification optical system according to the present embodiment, is equal to or falls below the lower limit value, thickness of the fourth lens group becomes small. In this case, refractive power of the fourth lens group becomes strong, or the number of lenses composing the fourth lens group becomes decreased. As a result, it becomes impossible to correct superbly curvature of field. Meanwhile, it is possible to attain the advantageous effect of the present embodiment more surely by setting the lower limit value of the conditional expression (9) to 0.025. In order to make the advantageous effect of the present embodiment more sure, it is preferable to set the lower limit value of the conditional expression (9) to 0.030, 0.035, 0.040, 0.043, 0.045, 0.048, 0.050, 0.053, and furthermore to 0.055.

Further, in the variable magnification optical system according to the present embodiment, it is desirable that the third lens group consists of a lens component and the following conditional expression (10) is satisfied:

$$-20.00 < R2f3/R1f3 < -1.00 \quad (10)$$

where R1f3 denotes a curvature radius of a most object side lens surface of the lens component, and R2f3 denotes a curvature radius of a most image side lens surface of the lens component.

The conditional expression (10) is a conditional expression that defines a shape of one lens component composing the third lens group. With satisfying the conditional expression (10), the variable magnification optical system according to the present embodiment can suppress ghost and flare caused by reflection by the lens surfaces and further can correct superbly curvature of field. Meanwhile, by the word lens component is meant a cemented lens of two or more lenses, or a single lens.

When the value of R2f3/R1f3 is equal to or exceeds the upper limit value of the conditional expression (10) of the variable magnification optical system according to the present embodiment, curvature of a concave shape toward the image side becomes large or tight so that the flare is apt to be easily generated. Meanwhile, it is possible to attain the advantageous effect of the present embodiment more surely by setting the upper limit of the conditional expression (10) to −1.05. In order to make the advantageous effect of the present embodiment more sure, it is preferable to set the upper limit value of the conditional expression (10) to −1.10, −1.15, −1.20, −1.30, −1.40, −1.50, −1.60, −1.70 and furthermore to −1.80.

On the other hand, when the value of R2f3/R1f3 in the conditional expression (10) of the variable magnification optical system according to the present embodiment, is equal to or falls below the lower limit value, effect of correcting curvature of field is reduced. Meanwhile, it is possible to attain the advantageous effect of the present embodiment more surely by setting the lower limit value of the conditional expression (10) to −19.00. In order to make the advantageous effect of the present embodiment more sure, it is preferable to set the lower limit value of the conditional expression (10) to −18.00, −17.00, −16.00, −15.00, −14.00, −13.00, −12.00, −11.00, and furthermore to −10.00.

In the variable magnification optical system according to the present embodiment, it is desirable that the third lens group has at least one aspherical surface, thereby it being possible to make a driving mechanism or structure of the third lens group that is the focusing lens group small in size and also to correct effectively variation in curvature of field from a focusing state onto an infinitely distant object to a focusing state onto a close distance object.

In the variable magnification optical system according to the present embodiment, it is desirable that the following conditional expression (11) is satisfied:

$$-16.00 < (-f23)/ft < 5.00 \quad (11)$$

where f23 denotes a focal length of the 2c lens group, and ft denotes a focal length of the variable magnification optical system as a whole in the telephoto end state.

The conditional expression (11) defines a ratio of the focal length of the 2c lens group and the focal length of the variable magnification optical system as a whole in the telephoto end state.

With satisfying the conditional expression (11), the variable magnification optical system according to the present embodiment can be made small in size and correct superbly coma aberration and spherical aberration.

When the value of (−f23)/ft is equal to or exceeds the upper limit value of the conditional expression (11) of the variable magnification optical system according to the present embodiment, refractive power of the 2c lens group becomes weak, and corrections of coma aberration and spherical aberration become insufficient. Meanwhile, it is possible to attain the advantageous effect of the present embodiment more surely by setting the upper limit value of the conditional expression (11) to 4.60. In order to make the advantageous effect of the present embodiment more sure, it is preferable to set the upper limit value of the conditional expression (11) to 4.30, 4.00, 3.50, 3.00, 2.80, 2.30, 2.00, 1.80, and furthermore to 1.50.

On the other hand, when the value of (−f23)/ft in the conditional expression (11) of the variable magnification optical system according to the present embodiment, is equal to or falls below the lower limit value, refractive power of the 2c lens group becomes strong, and coma aberration as well as spherical aberration become overcorrected. Meanwhile, it is possible to attain the advantageous effect of the present embodiment more surely by setting the lower limit value of the conditional expression (11) to 0.10. In order to make the advantageous effect of the present embodiment more sure, it is preferable to set the lower limit value of the conditional expression (11) to 0.15, 0.20, 0.25, 0.30, 0.35, 0.40, 0.45, 0.48, 0.50, and further to 0.53.

Further, in the variable magnification optical system according to the present embodiment, it is desirable that the following conditional expression (12) is satisfied:

$$50.0° < 2\omega < 120.0° \quad (12)$$

where 2ω denotes an entire angle of view of the variable magnification optical system in the wide angle end state.

The conditional expression (12) defines a condition for an optimum angle of view. With satisfying the conditional expression (12), the variable magnification optical system according to the present embodiment can be made small in size and correct superbly various aberrations.

In order to make the advantageous effect of the present embodiment sure, it is preferable to set the upper limit value of the conditional expression (12) to 115.0°. Further, in order to make the advantageous effect of the present embodiment more sure, it is preferable to set the upper limit value of the conditional expression (12) to 110.0°, 105.0°, 100.0°, 95.0°, 92.0°, 91.0°, 90.0°, 89.0°, and further to 88.5°.

In order to make the advantageous effect of the present embodiment sure, it is preferable to set the lower limit value of the conditional expression (12) to 55.0°. Further, in order to make the advantageous effect of the present embodiment more sure, it is preferable to set the lower limit value of the conditional expression (12) to 60.0°, 65.0°, 70.0°, 75.0°, 78.0°, 80.0°, 82.0°, 84.0°, and further to 84.5°.

Further, in the variable magnification optical system according to the present embodiment, it is desirable that the following conditional expression (13) is satisfied:

$$0.20 < Bfa/fw < 0.90 \quad (13)$$

where Bfa denotes an air converted back focus of the variable magnification optical system as a whole in the wide angle end state, and fw denotes a focal length of the variable magnification optical system as a whole in the wide angle end state.

The conditional expression (13) is a conditional expression that defines a ratio of the air converted back focus of the variable magnification optical system as a whole in the wide angle end state and the focal length of the variable magnification optical system as a whole in the wide angle end state. With satisfying the conditional expression (13), the variable magnification optical system according to the present embodiment can be made small in size, and various aberrations can be superbly corrected.

When the value of Bfa/fw is equal to or exceeds the upper limit value of the conditional expression (13), the back focus becomes large. It is not preferable in view of making the optical system small in size. Meanwhile, it is possible to attain the advantageous effect of the present embodiment more surely by setting the upper limit value of the conditional expression (13) to 0.85. In order to make the advantageous effect of the present embodiment more sure, it is preferable to set the upper limit value of the conditional expression (13) to 0.80, 0.78, 0.75, 0.73, 0.70, 0.68, 0.67, 0.66, and further to 0.65.

On the other hand, when the value of Bfa/fw in the conditional expression (13) of the variable magnification optical system according to the present embodiment, is equal to or falls below the lower limit value, the back focus becomes small, and there is a concern of an interference of the camera mechanism with the optical system. Meanwhile, it is possible to attain the advantageous effect of the present embodiment more surely by setting the lower limit value of the conditional expression (13) to 0.25. In order to make the advantageous effect of the present embodiment more sure, it is preferable to set the lower limit value of the conditional expression (13) to 0.30, 0.35, 0.40, 0.42, 0.45, 0.48, 0.50, 0.52, and further to 0.55.

Further, the optical equipment of the present embodiment has the variable magnification optical system having the above described configuration, so it is possible to realize an optical equipment which has superb optical performance and which is made small in size.

Further, a method for manufacturing a variable magnification optical system according to the present embodiment, is a method for manufacturing a variable magnification optical system which comprises, in order from an object side, a first lens group having negative refractive power, a second lens group having positive refractive power, a third lens group having negative refractive power and a fourth lens group having positive refractive power, comprising steps of;

constructing such that, upon varying a magnification, a distance between the first lens group and the second lens group being varied, a distance between said second lens group and said third lens group being varied, and a distance between the third lens group and the fourth lens group being varied;

constructing such that the first lens group consisting of, in order from the object side, a negative lens and a positive lens; and constructing such that the second lens group consisting of, in order from the object side, a 2a lens group having positive refractive power, a 2b lens group having positive refractive power, and a 2c lens group having negative refractive power.

According to the method as described above, it is possible to manufacture a variable magnification optical system which has excellent optical performance so that various aberrations may be corrected superbly and which can be made small in size.

Hereinafter, the variable magnification optical systems relating to numerical examples relating to the present embodiment will be explained with reference to the accompanying drawings.

First Example

FIG. 1 is a sectional view in the wide angle end state of a variable magnification optical system according to a First Example. Meanwhile, in FIG. 1 and FIG. 3, FIG. 5, FIG. 7, FIG. 9, FIG. 11 and FIG. 13 described later, arrows show movement trajectories of the respective lens groups upon varying magnification from a wide angle end state (W) to a telephoto end state (T).

The variable magnification optical system according to the present Example is composed of, in order from an object side, a first lens group G1 having negative refractive power, a second lens group G2 having positive refractive power, a third lens group G3 having negative refractive power, and a fourth lens group G4 having positive refractive power.

The first lens group G1 consists of, in order from the object side, a negative meniscus lens L11 having a convex surface facing an object side and a positive meniscus lens L12 having a convex surface facing an object side. The negative meniscus lens L11 is an aspherical lens whose image side glass lens surface is coated with aspherically shaped resin layer.

The second lens group G2 is composed of, in order from the object side, a 2a lens group G2a having positive refractive power, a 2b lens group G2b having positive refractive power, and a 2c lens group G2c having negative refractive power. An aperture stop S is located between the 2a lens group G2a and the 2b lens group G2b of the second lens group.

The 2a lens group G2a consists of a cemented positive lens constructed by a negative meniscus lens L21 having a convex surface facing the object side cemented with a positive meniscus lens L22 having a convex surface facing the object side. The negative meniscus lens L21 is an aspherical lens whose object side lens surface is aspherically shaped.

The 2b lens group G2b consists of a cemented positive lens constructed by a negative meniscus lens L23 having a convex surface facing the object side cemented with a double convex positive lens L24.

The 2c lens group G2c consists of a negative meniscus lens L25 having a convex surface facing the object side. The negative meniscus lens L25 is an aspherical lens whose object side lens surface is aspherically shaped.

The third lens group G3 consists of a double concave negative lens L31. The negative lens L31 is an aspherical lens whose object side lens surface and image side lens surface are aspherically shaped.

The fourth lens group G4 consists of a positive meniscus lens L41 having a concave surface facing the object side.

On the image plane I, an imaging device (not shown) such as CCD, CMOS or the like is disposed.

In the variable magnification optical system according to the present Example having above configuration, upon varying magnification from the wide angle end state to the telephoto end state, the first lens group G1, the second lens group G2 and the third lens group G3 are moved along the optical axis such that a distance between the first lens group G1 and the second lens group G2 is decreased, a distance between the second lens group G2 and the third lens group G3 is increased, and a distance between the third lens group G3 and the fourth lens group G4 is increased. In detail, the first lens group G1 is moved once to the image side and then to the object side, the second lens group G2 is moved to the object side, and the third lens group G3 is moved to the object side. Meanwhile, upon varying the magnification, the fourth lens group G4 is fixed with respect to the image plane I.

In the variable magnification optical system according to the present Example, focusing from an infinite distance object to a close distance object is carried out by moving the third lens group G3 along the optical axis toward the image side.

In the variable magnification optical system according to the present Example, correction of the image plane at the time when image blur occurs, that is, vibration reduction, is conducted by moving the 2b lens group G2b as a vibration reduction lens group to have a component in a direction perpendicular to the optical axis.

Table 1 below shows various values of the variable magnification optical system relating to the present Example.

In Table 1, "f" denotes a focal length, and "BF" denotes aback focus, that is, a distance along the optical axis from the most image side lens surface to the image plane I.

In [Surface Data], "m" denotes an order of an optical surface counted from the object side, "r" denotes a radius of curvature, "d" denotes a surface-to-surface distance, that is, an interval between an n-th surface and an (n+1)-th surface, where n is an integer, "vd" denotes an Abbe number for d-line (wavelength=587.6 nm), "nd" denotes refractive index for d-line (wavelength=587.6 nm), "ng" denotes refractive index for g-line (wavelength=435.8 nm). Further, "OP" denotes an object surface, "dn" denotes a variable surface-to-surface distance, where n is an integer, "S" denotes an aperture stop, and "I" denotes an image plane. Meanwhile, radius of curvature r=∞ denotes a plane surface, and refractive index of the air nd=1.00000 is omitted. In addition, an aspherical surface is expressed by attaching "*" to the surface number, and in the column of the radius of curvature "r", a paraxial radius of curvature is shown.

In [Aspherical Data], with respect to an aspherical surface shown in [Surface Data], an aspherical surface coefficient and a conical coefficient are shown in the case where the aspherical surface is exhibited by the following expression:

$$S(y)=(y^2/R)/[1+\{1-\kappa(y/R)^2\}^{1/2}]+C_4y^4+C_6y^6+C_8y^8+C_{10}y^{10}$$

where "y" denotes a height in the direction perpendicular to the optical axis, "S(y)" denotes a sag amount that is a distance along the optical axis from the tangent surface at the vertex of each aspherical surface at the height "y"; "κ" denotes a conical coefficient; "C4", "C6", "C8", "C10", "C12" and "C14" denote respective aspherical coefficients, and "R" denotes a paraxial radius of curvature that is a radius of curvature of a reference sphere. "E-n", where n is an integer, denotes "×10$^{-n}$", for example, "1.234E-05" denotes "1.234×10$^{-5}$".

"C2" denoting that second order aspherical coefficient is 0 and omitted.

In [Various Data], "f" denotes a focal length of the variable magnification optical system as a whole, "FNo" denotes an F-number, "2ω" denotes an angle of view (unit "°"), "Ymax" denotes a maximum image height, "TL" denotes a total length of the variable magnification optical system according to the present Example, that is, a distance along the optical axis from the first lens surface to the image plane I, "BF" denotes a back focus, that is, a distance on the optical axis from the most image side lens surface to the image plane I. Meanwhile, "W" denotes the wide angle end state, "M" denotes an intermediate focal length state, and "T" denotes a telephoto end state.

In [Variable Interval Data], "f" denotes a focal length of the optical system as a whole, "dn" denotes a variable interval from an n-th surface to an (n+1)-th surface, where n is an integer. Meanwhile, "W" denotes the wide angle end state, "M" denotes the intermediate focal length state, "T" denotes the telephoto end state.

In [Lens Group Data], a starting surface ST and the focal length f of each lens group are shown.

In [Values for Conditional Expressions], values corresponding to respective conditional expressions, are shown.

It is noted, here, that "mm" is generally used for the unit of length such as the focal length f, the radius of curvature r and the unit for other lengths shown in Table 1. However, since similar optical performance can be obtained by an optical system proportionally enlarged or reduced, the unit is not necessarily to be limited to "mm".

Meanwhile, the explanation of reference symbols in Table 1 described above, is the same in Tables for the other Examples described herein later.

[Aspherical Surface Data]
Surface Number: 3
  K=0.0000
  C4=5.57659E-05
  C6=1.55222E-07
  C8=-1.40739E-10
  C10=6.89982E-13
Surface Number: 6
  K=1.0000
  C4=-1.51464E-05
  C6=-2.85919E-08
  C8=-4.84293E-10
  C10=-8.67521E-12
Surface Number: 13
  K=1.0000
  C4=-7.39652E-05
  C6=-1.64020E-06
  C8=1.08994E-07
  C10=-1.80154E-09
Surface Number: 15
  K=1.0000
  C4=-2.45378E-04
  C6=2.50287E-06
  C8=-2.00932E-08
  C10=1.64201E-10
Surface Number: 16
  K=1.0000
  C4=-2.07691E-04
  C6=2.92258E-06
  C8=-2.50531E-08
  C10=1.04781E-10

TABLE 1

First Example
[Surface Data]

| m | r | d | vd | nd | ng |
|---|---|---|---|---|---|
| OP | ∞ | | | | |
| 1) | 125.7973 | 1.20 | 42.73 | 1.834810 | 1.859557 |
| 2) | 13.4148 | 0.10 | 36.64 | 1.560930 | 1.580890 |
| *3) | 12.2663 | 4.97 | | | |
| 4) | 17.5162 | 2.47 | 20.88 | 1.922860 | 1.982814 |
| 5) | 25.3582 | (d5) | | | |
| *6) | 19.6694 | 1.00 | 37.28 | 1.834410 | 1.863105 |
| 7) | 14.6517 | 3.30 | 52.33 | 1.755000 | 1.772953 |
| 8) | 162.3331 | 1.50 | | | |
| 9) (S) | ∞ | 1.90 | | | |
| 10) | 9.4378 | 0.70 | 32.32 | 1.953747 | 1.992060 |
| 11) | 6.7335 | 4.00 | 81.61 | 1.496997 | 1.504509 |
| 12) | -32.9446 | 1.40 | | | |
| *13) | 18.1461 | 0.90 | 45.45 | 1.801387 | 1.823574 |
| 14) | 9.6929 | (d14) | | | |
| *15) | -34.3749 | 1.00 | 45.45 | 1.801387 | 1.823574 |
| *16) | 40.0000 | (d16) | | | |
| 17) | -176.2842 | 4.50 | 32.32 | 1.953747 | 1.992060 |
| 18) | -28.4688 | (BF) | | | |
| I | ∞ | | | | |

[Various Data]
Variable magnification ratio 2.94

| | W | M | T |
|---|---|---|---|
| f | 16.48 | 35.00 | 48.50 |
| FNo | 3.61 | 5.25 | 6.36 |
| 2ω | 88.11 | 42.86 | 32.15 |
| Ymax | 14.20 | 14.20 | 14.20 |
| TL | 71.96 | 65.66 | 69.91 |
| BF | 9.90 | 9.90 | 9.90 |

[Variable Distance Data]

| | W | M | T |
|---|---|---|---|
| f | 16.48 | 35.00 | 48.50 |
| f5 | 24.17 | 6.25 | 2.00 |
| d14 | 5.33 | 10.82 | 13.69 |
| d16 | 3.62 | 9.75 | 14.82 |

[Lens Group Data]

| | ST | f |
|---|---|---|
| G1 | 1 | -26.45 |
| G2 | 6 | 17.88 |
| G3 | 15 | -22.93 |
| G4 | 17 | 35.08 |
| G2a | 6 | 30.39 |
| G2b | 10 | 20.50 |
| G2c | 13 | -27.26 |

[Values for Conditional Expressions]
(1) f11/f1=0.638
(2) f12/(-f1)=2.016
(3) f22/ft=0.423
(4) f21/ft=0.627
(5) (-fγw)=1.300
(6) f21/f22=1.482
(7) (-f3)/fw=1.392
(8) G2/TLt=0.210
(9) G4/TLt=0.064
(10) R2f3/R1f3=-1.164
(11) (-f23)/ft=0.562
(12) 2ω=88.110
(13) Bfa/fw=0.601

FIGS. 2A and 2B are graphs showing various aberrations, respectively, in the wide angle end state and in the telephoto end state, of the variable magnification optical system according to the First Example.

In the graphs showing aberrations as drawn in the respective graphs, "FNO" denotes an F-number, "A" denotes an incident angle of light rays, that is, a half angle of view (unit "·"). Meanwhile, in the graph showing spherical aberration, an F number corresponding to the largest diameter, is shown, and in the graphs showing astigmatism and distortion, the maximum values of the half angle of view A are, respectively, shown, and in graph showing coma aberration each half angle of view is shown. In graphs showing respective aberrations, "d" denotes d-line (wavelength 587.6 nm), "g" denotes g-line (wavelength 435.8 nm), and graphs attached with no "d" and no "g" showing aberrations of d-line. In graphs showing astigmatism, a solid line indicates a sagittal image plane, and a broken line indicates a meridional image plane. Graph showing coma aberration is with respect to a half angle of view "A".

Meanwhile, in graphs showing various aberrations in the other Examples as described below, the same symbols as in the present Example are employed.

As is apparent from the above-mentioned graphs showing aberrations, the variable magnification optical system relating to the present Example can correct superbly various aberrations over the wide angle end state to the telephoto end state and has excellent optical performance.

Second Example

Figure 3:
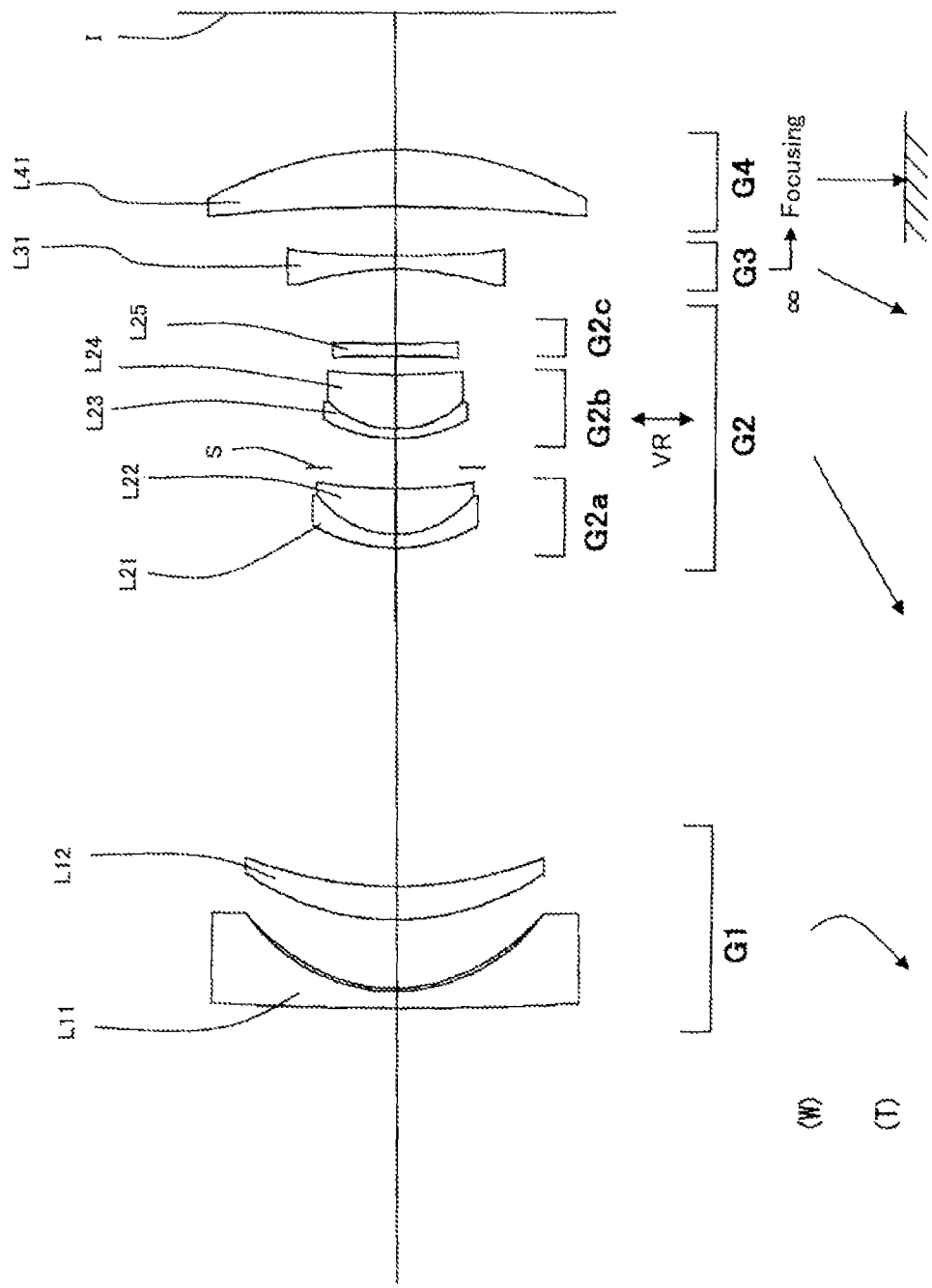
FIG. 3 is a sectional view in a wide angle end state, of the variable magnification optical system according to the Second Example.

FIG. 3 is a sectional view in the wide angle end state of a variable magnification optical system according to a Second Example of the present application.

The variable magnification optical system according to the present Example is composed of, in order from an object side, a first lens group G1 having negative refractive power, a second lens group G2 having positive refractive power, a third lens group G3 having negative refractive power, and a fourth lens group G4 having positive refractive power.

The first lens group G1 consists of, in order from the object side, a negative meniscus lens L11 having a convex surface facing an object side and a positive meniscus lens L12 having a convex surface facing the object side. The negative meniscus lens L11 is an aspherical lens whose image side glass lens surface is provided with aspherically shaped resin layer.

The second lens group G2 is composed of, in order from the object side, a 2a lens group G2a having positive refractive power, a 2b lens group G2b having positive refractive power, and a 2c lens group G2c having negative refractive power. An aperture stop S is located between the 2a lens group G2a and the 2b lens group G2b of the second group.

The 2a lens group G2a consists of a cemented positive lens constructed by a negative meniscus lens L21 having a convex surface facing the object side cemented with a positive meniscus lens L22 having a convex surface facing the object side. The negative meniscus lens L21 is an aspherical lens whose object side lens surface is aspherically shaped.

The 2b lens group G2b consists of a cemented positive lens constructed by a negative meniscus lens L23 having a convex surface facing the object side cemented with a positive meniscus lens L24 having a convex surface facing the object.

The 2c lens group G2c consists of a double concave negative lens L25. The negative lens L25 is an aspherical lens whose object side lens surface is aspherically shaped.

The third lens group G3 consists of a double concave negative lens L31. The negative lens L31 is an aspherical lens whose object side lens surface and image side lens surface are aspherically shaped.

The fourth lens group G4 consists of a positive meniscus lens L41 having a concave surface facing the object side.

On the image plane I, an imaging device (not shown) such as CCD, CMOS or the like is disposed.

In the variable magnification optical system according to the present Example having above configuration, upon varying magnification from the wide angle end state to the telephoto end state, the first lens group G1, the second lens group G2 and the third lens group G3 are moved along the optical axis such that a distance between the first lens group G1 and the second lens group G2 is decreased, a distance between the second lens group G2 and the third lens group G3 is increased, and a distance between the third lens group G3 and the fourth lens group G4 is increased. In detail, the first lens group G1 is moved once to the image side and then to the object side, the second lens group G2 is moved to the object side, and the third lens group G3 is moved to the object side. Meanwhile, upon varying the magnification, the fourth lens group G4 is fixed with respect to the image plane I.

In the variable magnification optical system according to the present Example, focusing from an infinite distance object to a close distance object is carried out by moving the third lens group G3 along the optical axis toward the image side.

In the variable magnification optical system according to the present Example, correction of the image plane at the time when image blur occurs, that is, vibration reduction, is conducted by moving the 2b lens group G2b as a vibration reducing lens group to have a component in a direction perpendicular to the optical axis.

Table 2 below shows various values of the variable magnification optical system relating to the present Example.

TABLE 2

Second Example
[Surface Data]

| m | r | d | vd | nd | ng |
|---|---|---|---|---|---|
| OP | ∞ | | | | |
| 1) | 234.3978 | 1.20 | 42.73 | 1.834810 | 1.859557 |
| 2) | 13.5837 | 0.20 | 36.64 | 1.560930 | 1.580890 |
| *3) | 12.5840 | 4.97 | | | |
| 4) | 19.3856 | 2.47 | 20.88 | 1.922860 | 1.982814 |
| 5) | 30.2795 | (d5) | | | |
| *6) | 12.2620 | 1.00 | 37.28 | 1.834410 | 1.863105 |

TABLE 2-continued

Second Example
[Surface Data]

| m | r | d | vd | nd | ng |
|---|---|---|----|----|----|
| 7) | 7.4723 | 3.30 | 52.33 | 1.755000 | 1.772953 |
| 8) | 37.8448 | 1.50 | | | |
| 9) (S) | ∞ | 2.10 | | | |
| 10) | 10.8585 | 0.70 | 32.32 | 1.953747 | 1.992060 |
| 11) | 7.4800 | 4.00 | 81.61 | 1.496997 | 1.504509 |
| 12) | 48.7880 | 1.40 | | | |
| *13) | −222.1192 | 0.90 | 45.45 | 1.801387 | 1.823574 |
| 14) | 322.4924 | (d14) | | | |
| *15) | −22.1912 | 1.00 | 45.45 | 1.801387 | 1.823574 |
| *16) | 150.0000 | (d16) | | | |
| 17) | −140.0701 | 4.15 | 32.32 | 1.953747 | 1.992060 |
| 18) | −28.8384 | (BF) | | | |
| I | ∞ | | | | |

[Aspherical Data]
Surface Number: 3
  K=0.0000
  C4=4.03793E-05
  C6=7.56897E-08
  C8=−3.47835E-10
  C10=4.74887E-13
Surface Number: 6
  K=1.0000
  C4=−5.40717E-06
  C6=−1.52719E-07
  C8=3.78212E-09
  C10=−3.33602E-11
Surface Number: 13
  K=1.0000
  C4=−1.53164E-04
  C6=4.41893E-07
  C8=−9.85968E-08
  C10=2.04214E-09
Surface Number: 15
  K=1.0000
  C4=2.96657E-05
  C6=−2.21789E-07
  C8=1.10487E-08
  C10=−4.19378E-11
Surface Number: 16
  K=1.0000
  C4=6.42683E-05
  C6=−2.63833E-07
  C8=5.05296E-09
  C10=−2.24350E-11

[Various Data]
Variable magnification ratio 2.94

| | W | M | T |
|---|---|---|---|
| f | 16.48 | 35.00 | 48.50 |
| FNo | 3.52 | 5.08 | 6.31 |
| 2ω | 88.00 | 42.70 | 31.75 |
| Ymax | 14.20 | 14.20 | 14.20 |
| TL | 72.25 | 65.75 | 69.84 |
| BF | 9.90 | 9.90 | 9.90 |

[Variable Distance Data]

| | W | M | T |
|---|---|---|---|
| f | 16.48 | 35.00 | 48.50 |
| d5 | 24.58 | 6.37 | 2.00 |
| d14 | 5.33 | 11.53 | 14.97 |
| d16 | 3.55 | 9.06 | 13.53 |

[Lens Group Data]

| | ST | f |
|---|---|---|
| G1 | 1 | −25.80 |
| G2 | 6 | 18.42 |
| G3 | 15 | −24.06 |
| G4 | 17 | 37.40 |
| G2a | 6 | 24.53 |
| G2b | 10 | 51.00 |
| G2c | 13 | −164.01 |

[Values for Conditional Expressions]
  (1) f11/f1=0.634
  (2) f12/(−f1)=2.041
  (3) f22/ft=1.052
  (4) f21/ft=0.506
  (5) (−fγw)=1.250
  (6) f21/f22=0.481
  (7) (−f3)/fw=1.460
  (8) G2/TLt=0.213
  (9) G4/TLt=0.059
  (10) R2f3/R1f3=−6.759
  (11) (−f23)/ft=3.382
  (12) 2ω=88.000
  (13) Bfa/fw=0.601

FIGS. 4A and 4B are graphs showing various aberrations, respectively, in the wide angle end state and in the telephoto end state, of the variable magnification optical system according to the Second Example.

As is apparent from the above-mentioned graphs showing aberrations, the variable magnification optical system relating to the present Example can correct superbly various aberrations over the wide angle end state to the telephoto end state and has excellent optical performance.

Third Example

Figure 5:
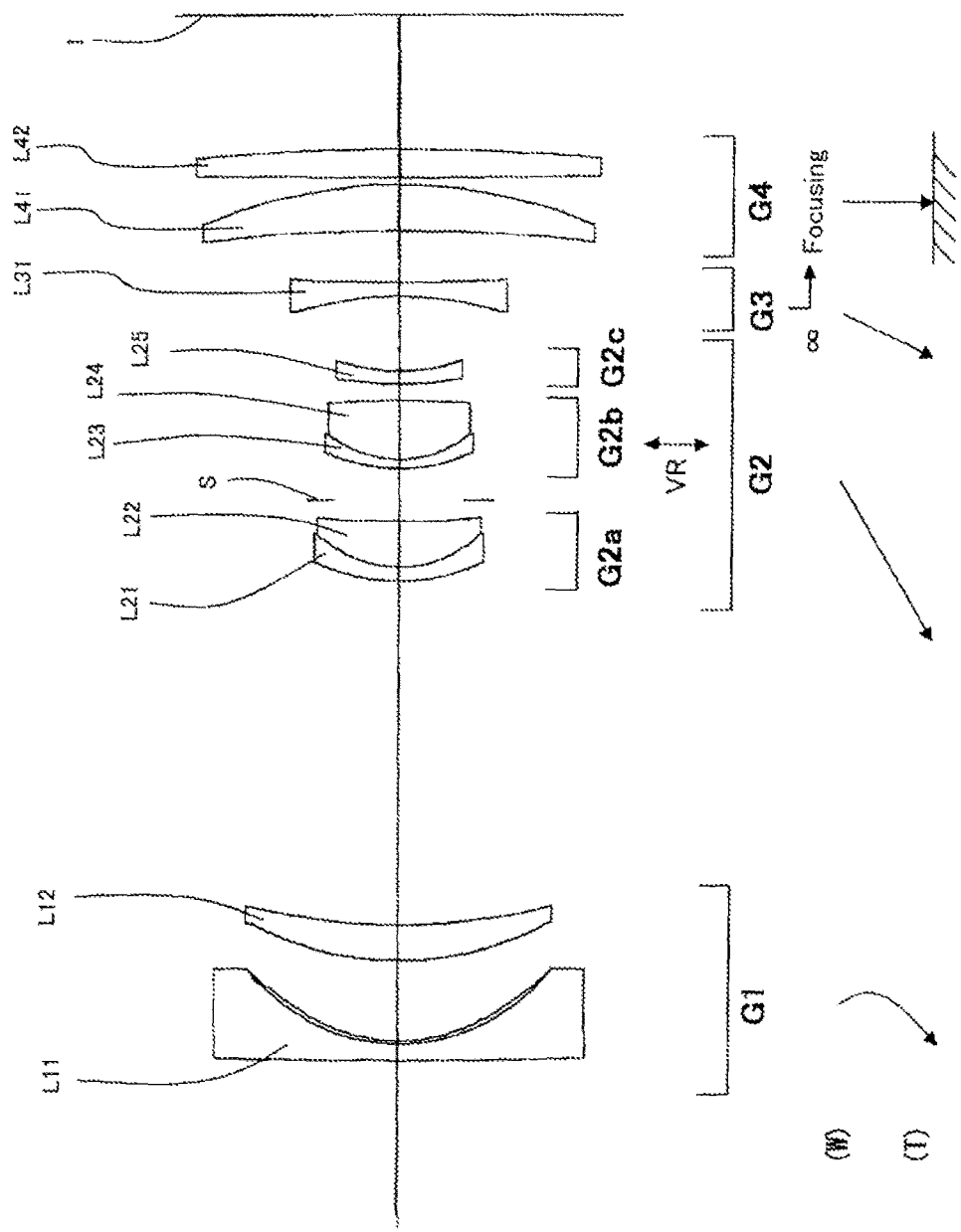
FIG. 5 is a sectional view in a wide angle end state, of a variable magnification optical system according to a Third Example.

FIG. 5 is a sectional view in the wide angle end state of a variable magnification optical system according to a Third Example.

The variable magnification optical system according to the present Example is composed of, in order from an object side, a first lens group G1 having negative refractive power, a second lens group G2 having positive refractive power, a third lens group G3 having negative refractive power, and a fourth lens group G4 having positive refractive power.

The first lens group G1 consists of, in order from the object side, a negative meniscus lens L11 having a convex surface facing an object side, and a positive meniscus lens L12 having a convex surface facing an object side. The negative meniscus lens L11 is an aspherical lens whose image side glass lens surface is provided with aspherically shaped resin layer.

The second lens group G2 is composed of, in order from the object side, a 2a lens group G2a having positive refractive power, a 2b lens group G2b having positive refractive power, and a 2c lens group G2c having negative refractive power. An aperture stop S is located between the 2a lens group G2a and the 2b lens group G2b of the second lens group.

The 2a lens group G2a consists of a cemented positive lens constructed by a negative meniscus lens L21 having a convex surface facing the object side cemented with a positive meniscus lens L22 having a convex surface facing the object side. The negative meniscus lens L21 is an aspherical lens whose object side lens surface is aspherically shaped.

The 2b lens group G2b consists of a cemented positive lens constructed by a negative meniscus lens L23 having a convex surface facing the object side cemented with a double convex positive lens L24.

The 2c lens group G2c consists of a negative meniscus lens L25 having a convex surface facing the object side. The negative meniscus lens L25 is an aspherical lens whose object side lens surface is aspherically shaped.

The third lens group G3 consists of a double concave negative lens L31. The negative lens L31 is an aspherical lens whose object side lens surface and image side lens surface are aspherically shaped.

The fourth lens group G4 consists of a positive meniscus lens L41 having a concave surface facing the object side, and a double convex positive lens L42.

On the image plane I, an imaging device (not shown) such as CCD, CMOS or the like is disposed.

In the variable magnification optical system according to the present Example having the above configuration, upon varying magnification from the wide angle end state to the telephoto end state, the first lens group G1, the second lens group G2 and the third lens group G3 are moved along the optical axis such that a distance between the first lens group G1 and the second lens group G2 is decreased, a distance between the second lens group G2 and the third lens group G3 is increased, and a distance between the third lens group G3 and the fourth lens group G4 is increased. In detail, the first lens group G1 is moved once to the image side and then to the object side, the second lens group G2 is moved to the object side, and the third lens group G3 is moved to the object side. Meanwhile, upon varying the magnification, the fourth lens group G4 is fixed with respect to the image plane I.

In the variable magnification optical system according to the present Example, focusing from an infinite distance object to a close distance object is carried out by moving the third lens group G3 along the optical axis toward the image side.

In the variable magnification optical system according to the present Example, correction of the image plane at the time when image blur occurs, that is, vibration reduction, is conducted by moving the 2b lens group as a vibration reducing lens group to have a component in a direction perpendicular to the optical axis.

Table 3 below shows various values of the variable magnification optical system relating to the present Example.

TABLE 3

Third Example
[Surface Data]

| m | r | d | vd | nd | ng |
|---|---|---|---|---|---|
| OF | ∞ | | | | |
| 1) | 415.8197 | 1.20 | 42.73 | 1.834810 | 1.859557 |
| 2) | 13.9397 | 0.20 | 36.64 | 1.560930 | 1.580890 |
| *3) | 12.2524 | 5.76 | | | |
| 4) | 23.3129 | 2.50 | 20.88 | 1.922860 | 1.982814 |
| 5) | 45.3700 | (d5) | | | |
| *6) | 14.1993 | 1.00 | 37.28 | 1.834410 | 1.863105 |
| 7) | 8.4743 | 3.30 | 52.33 | 1.755000 | 1.772953 |
| 8) | 69.9056 | 1.50 | | | |
| 9) (S) | ∞ | 2.30 | | | |
| 10) | 12.4272 | 0.70 | 32.32 | 1.953747 | 1.992060 |
| 11) | 8.3425 | 4.10 | 81.61 | 1.496997 | 1.504509 |
| 12) | −66.3702 | 1.20 | | | |
| *13) | 25.4896 | 0.90 | 45.45 | 1.801387 | 1.823574 |
| 14) | 13.6978 | (d14) | | | |
| *15) | −29.0995 | 1.00 | 45.45 | 1.801387 | 1.823574 |
| *16) | 117.1841 | (d16) | | | |
| 17) | −116.7933 | 3.27 | 32.32 | 1.953747 | 1.992060 |
| 18) | −36.3587 | 0.50 | | | |
| 19) | 971.6152 | 2.00 | 32.32 | 1.953747 | 1.992060 |
| 20) | −167.5953 | (BF) | | | |
| I | ∞ | | | | |

[Aspherical Data]

Surface Number: 3
K=0.0000
C4=2.01514E-05
C6=7.60272E-08
C8=−8.33546E-10
C10=1.57294E-12

Surface Number: 6
K=1.0000
C4=−1.19935E-05
C6=−7.39414E-08
C8=1.06814E-09
C10=−8.74368E-12

Surface Number: 13
K=1.0000
C4=−9.48763E-05
C6=−1.20944E-07
C8=−3.50716E-08
C10=7.10609E-10

Surface Number: 15
K=1.0000
C4=−1.33067E-04
C6=2.79113E-06
C8=−1.66578E-08
C10=−3.03507E-11

Surface Number: 16
K=1.0000
C4=−9.59859E-05
C6=2.68605E-06
C8=−2.60631E-08
C10=8.24910E-11

[Various Data]
Variable magnification ratio 2.94

| | W | M | T |
|---|---|---|---|
| f | 16.48 | 35.00 | 48.50 |
| FNo | 3.62 | 5.37 | 6.60 |
| 2ω | 85.97 | 42.77 | 31.70 |
| Ymax | 14.20 | 14.20 | 14.20 |
| TL | 74.46 | 70.08 | 74.92 |
| BF | 9.55 | 9.55 | 9.55 |

[Variable Distance Data]

| | W | M | T |
|---|---|---|---|
| f | 16.48 | 35.00 | 48.50 |
| d5 | 24.44 | 6.57 | 2.05 |
| d14 | 5.30 | 10.52 | 13.64 |
| d16 | 3.74 | 12.01 | 17.71 |

[Lens Group Data]

| | ST | f |
|---|---|---|
| G1 | 1 | −26.74 |
| G2 | 6 | 19.27 |
| G3 | 15 | −29.00 |
| G4 | 17 | 39.98 |
| G2a | 6 | 24.85 |
| G2b | 10 | 33.00 |
| G2c | 13 | −38.25 |

[Values for Conditional Expressions]
(1) f11/f1=0.589
(2) f12/(−f1)=1.843
(3) f22/ft=0.680
(4) f21/ft=0.512
(5) (−fγw)=1.250
(6) f21/f22=0.753
(7) (−f3)/fw=1.760
(8) G2/TLt=0.200
(9) G4/TLt=0.077
(10) R2f3/R1f3=−4.027
(11) (−f23)/ft=0.789
(12) 2ω=85.970
(13) Bfa/fw=0.579

FIGS. 6A and 6B are graphs showing various aberrations, respectively, in the wide angle end state and in the telephoto end state, of the variable magnification optical system according to the Third Example.

As is apparent from the above-mentioned graphs showing aberrations, the variable magnification optical system relating to the present Example can correct superbly various aberrations over the wide angle end state to the telephoto end state and has excellent optical performance.

Fourth Example

Figure 7:
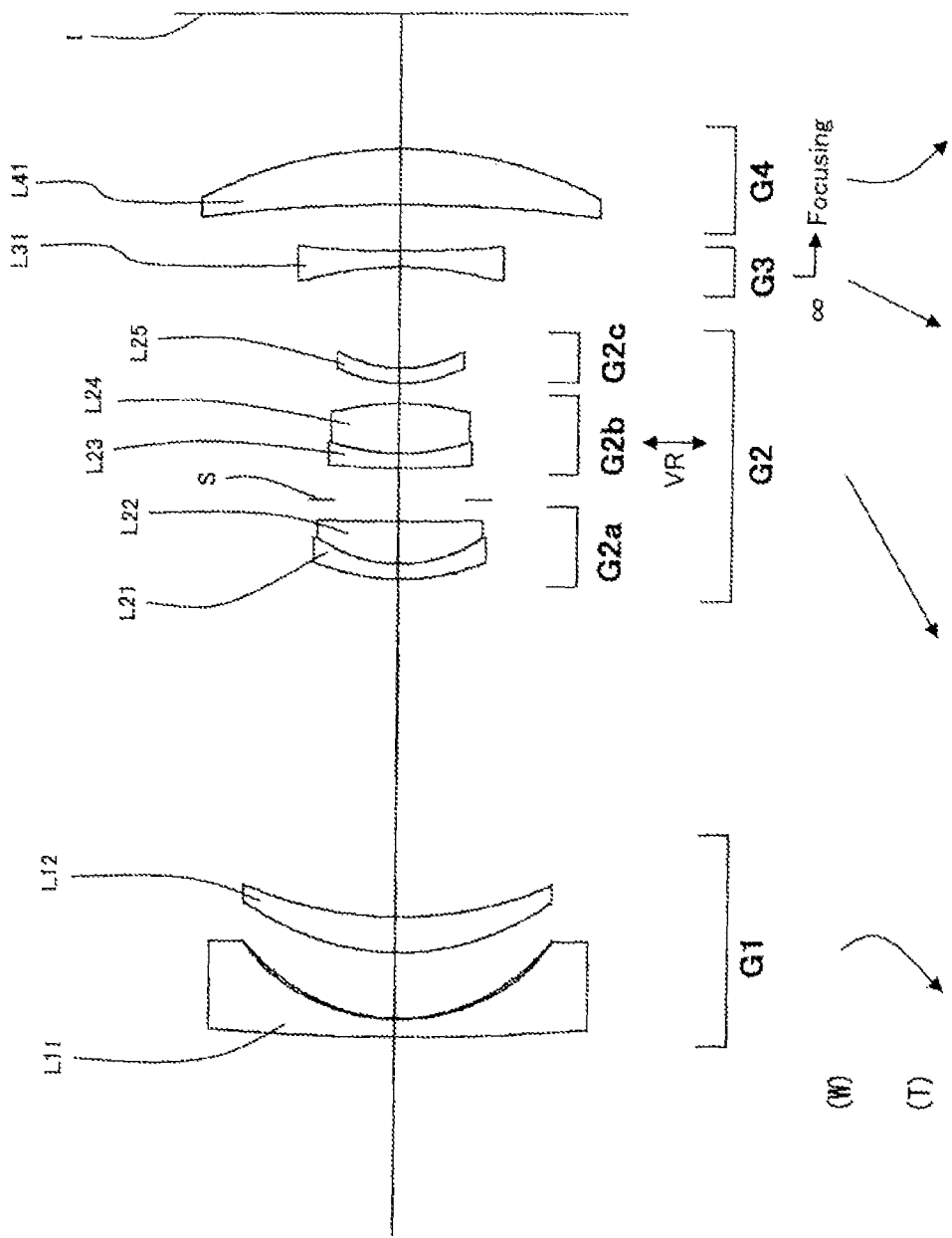
FIG. 7 is a sectional view in a wide angle end state, of a variable magnification optical system according to a Fourth Example.

FIG. 7 is a sectional view in the wide angle end state of a variable magnification optical system according to a Fourth Example.

The variable magnification optical system according to the present Example is composed of, in order from an object side, a first lens group G1 having negative refractive power, a second lens group G2 having positive refractive power, a third lens group G3 having negative refractive power, and a fourth lens group G4 having positive refractive power.

The first lens group G1 consists of, in order from the object side, a negative meniscus lens L11 having a convex surface facing an object side and a positive meniscus lens L12 having a convex surface facing an object side. The negative meniscus lens L11 is an aspherical lens whose image side glass lens surface is provided with aspherically shaped resin layer.

The second lens group G2 is composed of, in order from the object side, a 2a lens group G2a having positive refractive power, a 2b lens group G2b having positive refractive power, and a 2c lens group G2c having positive refractive power. An aperture stop S is located between the 2a lens group G2a and the 2b lens group G2b of the second lens group.

The 2a lens group G2a consists of a cemented positive lens constructed by a negative meniscus lens L21 having a convex surface facing the object side cemented with a positive meniscus lens L22 having a convex surface facing the object side. The negative meniscus lens L21 is an aspherical lens whose object side lens surface is aspherically shaped.

The 2b lens group G2b consists of a cemented positive lens constructed by a negative meniscus lens L23 having a convex surface facing the object side cemented with a double convex positive lens L24.

The 2c lens group G2c consists of a positive meniscus lens L25 having a convex surface facing the object side. The positive meniscus lens L25 is an aspherical lens whose object side lens surface is aspherically shaped.

The third lens group G3 consists of a double concave negative lens L31. The negative lens L31 is an aspherical lens whose object side lens surface and image side lens surface are aspherically shaped.

The fourth lens group G4 consists of a positive meniscus lens L41 having a concave surface facing the object side.

On the image plane I, an imaging device (not shown) such as CCD, CMOS or the like is disposed.

In the variable magnification optical system according to the present Example having the above configuration, upon varying magnification from the wide angle end state to the telephoto end state, the first lens group G1, the second lens group G2, the third lens group G3 and the fourth lens group G4 are moved along the optical axis such that a distance between the first lens group G1 and the second lens group G2 is decreased, a distance between the second lens group G2 and the third lens group G3 is increased, and a distance between the third lens group G3 and the fourth lens group G4 is increased. In detail, the first lens group G1 is moved once to the image side and then to the object side, the second lens group G2 is moved to the object side, the third lens group G3 is moved to the object side, and the fourth lens group G4 is moved once to the object side and then to the image side.

In the variable magnification optical system according to the present Example, focusing from an infinite distance object to a close distance object is carried out by moving the third lens group G3 along the optical axis toward the image side.

In the variable magnification optical system according to the present Example, correction of the image plane at the time when image blur occurs, that is, vibration reduction, is conducted by moving the 2b lens group as a vibration reduction lens group to have a component in a direction perpendicular to the optical axis.

Table 4 below shows various values of the variable magnification optical system relating to the present Example.

TABLE 4

Fourth Example
[Surface Data]

| m | r | d | νd | nd | ng |
|---|---|---|---|---|---|
| OP | ∞ | | | | |
| 1) | 169.1820 | 1.20 | 42.73 | 1.834810 | 1.859557 |
| 2) | 13.8308 | 0.10 | 36.64 | 1.560930 | 1.580890 |
| *3) | 12.7005 | 4.70 | | | |

TABLE 4-continued

Fourth Example
[Surface Data]

| m | r | d | vd | nd | ng |
|---|---|---|----|----|----|
| 4) | 18.7978 | 2.47 | 20.88 | 1.922860 | 1.982814 |
| 5) | 28.2383 | (d5) | | | |
| *6) | 15.6168 | 1.10 | 37.28 | 1.834410 | 1.863105 |
| 7) | 10.3108 | 3.00 | 52.33 | 1.755000 | 1.772953 |
| 8) | 202.8228 | 1.50 | | | |
| 9) (S) | ∞ | 2.30 | | | |
| 10) | 57.1584 | 1.10 | 32.32 | 1.953747 | 1.992060 |
| 11) | 15.9047 | 3.50 | 81.61 | 1.496997 | 1.504509 |
| 12) | −19.4256 | 1.40 | | | |
| *13) | 9.6189 | 1.10 | 45.45 | 1.801387 | 1.823574 |
| 14) | 9.2769 | (d14) | | | |
| *15) | −22.2675 | 1.10 | 45.45 | 1.801387 | 1.823574 |
| *16) | 150.0000 | (d16) | | | |
| 17) | −114.9236 | 4.0000 | 32.32 | 1.953747 | 1.992060 |
| 18) | −30.5298 | (BF) | | | |
| I | ∞ | | | | |

[Aspherical Surface Data]
Surface Number: 3
  K=0.0000
  C4=4.01896E-05
  C6=8.69299E-08
  C8=−1.62310E-10
  C10=−1.75455E-13
Surface Number: 6 K=1.0000
  C4=−2.32045E-05
  C6=−3.43812E-07
  C8=7.11770E-09
  C10=−8.59494E-11
Surface Number: 13
  K=1.0000
  C4=−4.01902E-05
  C6=4.96254E-07
  C8=−5.88669E-08
  C10=1.11602E-09
Surface Number: 15
  K=1.0000
  C4=5.77251E-05
  C6=−2.91771E-06
  C8=5.88232E-08
  C10=−3.04864E-10
Surface Number: 16
  K=1.0000
  C4=1.05257E-04
  C6=−2.44529E-06
  C8=4.19957E-08
  C10=−2.44101E-10

[Various Data]
Variable magnification ratio 2.95

| | W | M | T |
|---|---|---|---|
| f | 16.48 | 34.95 | 48.56 |
| FNo | 3.49 | 5.18 | 6.72 |
| 2ω | 87.61 | 43.00 | 32.11 |
| Ymax | 14.20 | 14.20 | 14.20 |
| TL | 72.45 | 67.01 | 71.17 |
| BF | 9.55 | 9.89 | 8.71 |

[Variable Distance Data]

| | W | M | T |
|---|---|---|---|
| f | 16.48 | 34.95 | 48.56 |
| d5 | 23.92 | 5.99 | 2.00 |
| d14 | 7.15 | 11.38 | 13.40 |
| d16 | 3.26 | 11.18 | 18.49 |

[Lens Group Data]

| | ST | f |
|---|---|---|
| G1 | 1 | −26.46 |
| G2 | 6 | 18.55 |
| G3 | 15 | −24.13 |
| G4 | 17 | 42.61 |
| G2a | 6 | 23.44 |
| G2b | 10 | 70.00 |
| G2c | 13 | 755.63 |

[Values for Conditional Expressions]
  (1) f11/f1=0.642
  (2) f12/(−f1)=2.046
  (3) f22/ft=1.442
  (4) f21/ft=0.483
  (5) (−fγw)=1.260
  (6) f21/f22=0.335
  (7) (−f3)/fw=1.464
  (8) G2/TLt=0.211
  (9) G4/TLt=0.056
  (10) R2f3/R1f3=−6.736
  (11) (−f23)/ft=−15.561
  (12) 2ω=87.610
  (13) Bfa/fw=0.580

FIGS. 8A and 8B are graphs showing various aberrations, respectively, in the wide angle end state and in the telephoto end state, of the variable magnification optical system according to the Fourth Example.

As is apparent from the above-mentioned graphs showing various aberrations, the variable magnification optical system relating to the present Example can correct superbly various aberrations over the wide angle end state to the telephoto end state and has excellent optical performance.

Fifth Example

FIG. 9 is a sectional view in the wide angle end state of a variable magnification optical system according to a Fifth Example.

The variable magnification optical system according to the present Example is composed of, in order from an object side, a first lens group G1 having negative refractive power, a second lens group G2 having positive refractive power, a third lens group G3 having negative refractive power, and a fourth lens group G4 having positive refractive power.

The first lens group G1 consists of, in order from the object side, a negative meniscus lens L11 having a convex surface facing an object side and a positive meniscus lens L12 having a convex surface facing an object side. The negative meniscus lens L11 is an aspherical lens whose image side glass lens surface is provided with aspherically shaped resin layer.

The second lens group G2 is composed of, in order from the object side, a 2a lens group G2a having positive refractive power, a 2b lens group G2b having positive refractive power, and a 2c lens group G2c having negative refractive power. An aperture stop S is located between the 2a lens group G2a and the 2b lens group G2b of the second lens group.

The 2a lens group G2a consists of a cemented positive lens constructed by a negative meniscus lens L21 having a convex surface facing the object side cemented with a positive meniscus lens L22 having a convex surface facing the object side. The negative meniscus lens L21 is an aspherical lens whose object side lens surface is aspherically shaped.

The 2b lens group G2b consists of a cemented positive lens constructed by a negative meniscus lens L23 having a convex surface facing the object side cemented with a double convex positive lens L24.

The 2c lens group G2c consists of a negative meniscus lens L25 having a convex surface facing the object side. The negative meniscus lens L25 is an aspherical lens whose object side lens surface is aspherically shaped.

The third lens group G3 consists of a double concave negative lens L31. The negative lens L31 is an aspherical lens whose object side lens surface and image side lens surface are aspherically shaped.

The fourth lens group G4 consists of a double convex positive lens L41.

On the image plane I, an imaging device (not shown) such as CCD, CMOS or the like is disposed.

In the variable magnification optical system according to the present Example having the above configuration, upon varying magnification from the wide angle end state to the telephoto end state, the first lens group G1, the second lens group G2 and the third lens group G3 are moved along the optical axis such that a distance between the first lens group G1 and the second lens group G2 is decreased, a distance between the second lens group G2 and the third lens group G3 is increased, and a distance between the third lens group G3 and the fourth lens group G4 is increased. In detail, the first lens group G1 is moved once to the image side and then to the object side, the second lens group G2 is moved to the object side, and the third lens group G3 is moved to the object side. Meanwhile, upon varying the magnification, the fourth lens group G4 is fixed with respect to the image plane I.

In the variable magnification optical system according to the present Example, focusing from an infinite distance object to a close distance object is carried out by moving the third lens group G3 along the optical axis toward the image side.

In the variable magnification optical system according to the present Example, correction of the image plane at the time when image blur occurs, that is, vibration reduction, is conducted by moving the 2b lens group G2b as a vibration reducing lens group to have a component in a direction perpendicular to the optical axis.

Table 5 below shows various values of the variable magnification optical system relating to the present Example.

TABLE 5

Fifth Example
[Surface Data]

| m | r | d | vd | nd | ng |
|---|---|---|---|---|---|
| OP | ∞ | | | | |
| 1) | 149.5188 | 1.20 | 42.73 | 1.834810 | 1.859557 |
| 2) | 13.5237 | 0.10 | 36.64 | 1.560930 | 1.580890 |
| *3) | 12.2879 | 4.97 | | | |

TABLE 5-continued

Fifth Example
[Surface Data]

| m | r | d | vd | nd | ng |
|---|---|---|---|---|---|
| 4) | 18.9482 | 2.47 | 20.88 | 1.922860 | 1.982814 |
| 5) | 28.9505 | (d5) | | | |
| *6) | 13.5032 | 1.00 | 37.28 | 1.834410 | 1.863105 |
| 7) | 11.0874 | 3.30 | 54.61 | 1.729160 | 1.745716 |
| 8) | 22.3650 | 1.50 | | | |
| 9) (S) | ∞ | 1.92 | | | |
| 10) | 8.9895 | 0.70 | 32.32 | 1.953747 | 1.992060 |
| 11) | 6.4452 | 4.40 | 81.61 | 1.496997 | 1.504509 |
| 12) | −92.6886 | 1.50 | | | |
| *13) | 12.5893 | 0.90 | 45.45 | 1.801387 | 1.823574 |
| 14) | 10.8067 | (d14) | | | |
| *15) | −25.9570 | 1.00 | 45.45 | 1.801387 | 1.823574 |
| *16) | 50.0000 | (d16) | | | |
| 17) | 9009.6763 | 4.17 | 32.32 | 1.953747 | 1.992060 |
| 18) | −37.5109 | (BF) | | | |
| I | ∞ | | | | |

[Aspherical Surface Data]
Surface Number: 3
K=0.0000
C4=4.47610E-05
C6=3.37093E-08
C8=2.20559E-10
C10=−1.76168E-12
Surface Number: 6
K=1.0000
C4=−6.44422E-06
C6=−3.63219E-07
C8=1.03860E-08
C10=−1.25875E-10
Surface Number: 13
K=1.0000
C4=−1.14297E-04
C6=6.12084E-07
C8=−7.62496E-08
C10=2.35513E-09
Surface Number: 15
K=1.0000
C4=−1.32259E-04
C6=3.59497E-06
C8=−3.34480E-08
C10=6.16335E-11
Surface Number: 16
K=1.0000
C4=−8.78501E-05
C6=3.61823E-06
C8=−5.19557E-08
C10=2.89309E-10

[Various Data]

Variable magnification ratio 2.94

| | W | M | T |
|---|---|---|---|
| f | 16.48 | 35.00 | 48.50 |
| FNO | 3.55 | 5.17 | 6.40 |
| 2ω | 87.39 | 42.95 | 31.90 |
| Ymax | 14.20 | 14.20 | 14.20 |
| TL | 72.45 | 67.65 | 72.40 |
| BF | 10.45 | 10.45 | 10.45 |

[Variable Distance Data]

|  | W | M | T |
|---|---|---|---|
| f | 16.48 | 35.00 | 48.50 |
| d5 | 23.92 | 6.34 | 2.00 |
| d14 | 5.33 | 9.36 | 11.50 |
| d16 | 3.62 | 12.37 | 18.77 |

[Lens Group Data]

|  | ST | f |
|---|---|---|
| G1 | 1 | −26.19 |
| G2 | 6 | 17.89 |
| G3 | 15 | −21.20 |
| G4 | 17 | 39.18 |
| G2a | 6 | 41.00 |
| G2b | 10 | 23.54 |
| G2c | 13 | −122.82 |

[Values for Conditional Expressions]
(1) f11/f1=0.635
(2) f12/(−f1)=2.029
(3) f22/ft=0.485
(4) f21/ft=0.845
(5) (−fγw)=1.530
(6) f21/f22=1.742
(7) (−f3)/fw=1.286
(8) G2/TLt=0.210
(9) G4/TLt=0.058
(10) R2f3/R1f3=−1.926
(11) (−f23)/ft=2.532
(12) 2ω=87.390
(13) Bfa/fw=0.634

FIGS. 10A and 10B are graphs showing various aberrations, respectively, in the wide angle end state and in the telephoto end state, of the variable magnification optical system according to the Fifth Example.

As is apparent from the respective graphs showing various aberrations, the variable magnification optical system relating to the present Example can correct superbly various aberrations over the wide angle end state to the telephoto end state and has excellent optical performance.

Sixth Example

Figure 11:
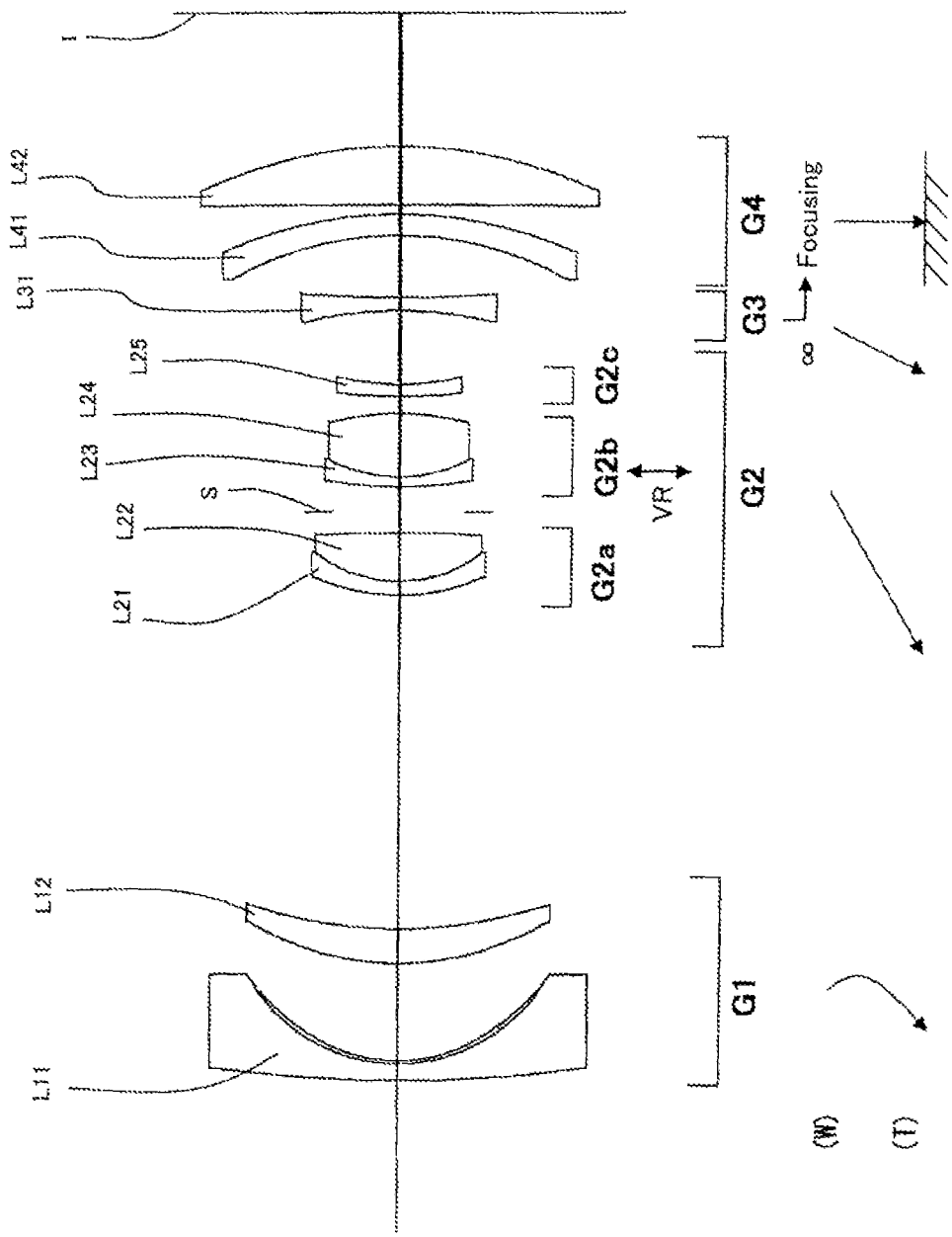
FIG. 11 is a sectional view in a wide angle end state, of a variable magnification optical system according to a Sixth Example.

FIG. 11 is a sectional view in a wide angle end state of a variable magnification optical system according to a Sixth Example.

The variable magnification optical system according to the present Example is composed of, in order from an object side, a first lens group G1 having negative refractive power, a second lens group G2 having positive refractive power, a third lens group G3 having negative refractive power, and a fourth lens group G4 having positive refractive power.

The first lens group G1 consists of, in order from the object side, a negative meniscus lens L11 having a convex surface facing an object side, and a positive meniscus lens L12 having a convex surface facing an object side. The negative meniscus lens L11 is an aspherical lens whose image side glass lens surface is provided with aspherically shaped resin layer.

The second lens group G2 is composed of, in order from the object side, a 2a lens group G2a having positive refractive power, a 2b lens group G2b having positive refractive power, and a 2c lens group G2c having negative refractive power. An aperture stop S is located between the 2a lens group G2a and the 2b lens group G2b of the second lens group.

The 2a lens group G2a consists of a cemented positive lens constructed by a negative meniscus lens L21 having a convex surface facing the object side cemented with a double convex positive lens L22. The negative meniscus lens L21 is an aspherical lens whose object side lens surface is aspherically shaped.

The 2b lens group G2b consists of a cemented positive lens constructed by a negative meniscus lens L23 having a convex surface facing the object side cemented with a double convex positive lens L24.

The 2c lens group G2c consists of a negative meniscus lens L25 having a convex surface facing the object side. The negative meniscus lens L25 is an aspherical lens whose object side lens surface is aspherically shaped.

The third lens group G3 consists of a double concave negative lens L31. The negative lens L31 is an aspherical lens whose object side lens surface and image side lens surface are aspherically shaped.

The fourth lens group G4 consists of a negative meniscus lens L41 having a concave surface facing the object side, and a positive meniscus lens L42 having a concave surface facing the object side.

On the image plane I, an imaging device (not shown) such as CCD, CMOS or the like is disposed.

In the variable magnification optical system according to the present Example having the above described configuration, upon varying magnification from the wide angle end state to the telephoto end state, the first lens group G1, the second lens group G2 and the third lens group G3 are moved along the optical axis such that a distance between the first lens group G1 and the second lens group G2 is decreased, a distance between the second lens group G2 and the third lens group G3 is increased, and a distance between the third lens group G3 and the fourth lens group G4 is increased. In detail, the first lens group G1 is moved once to the image side and then to the object side, the second lens group G2 is moved to the object side, and the third lens group G3 is moved to the object side. Meanwhile, upon varying the magnification, the fourth lens group G4 is fixed with respect to the image plane I.

In the variable magnification optical system according to the present Example, focusing from an infinite distance object to a close distance object is carried out by moving the third lens group G3 along the optical axis toward the image side.

In the variable magnification optical system according to the present Example, correction of the image plane at the time when image blur occurs, that is, vibration reduction, is conducted by moving the 2b lens group G2b as a vibration reducing lens group to have a component in a direction perpendicular to the optical axis.

Table 6 below shows various values of the variable magnification optical system relating to the present Example.

TABLE 6

Sixth Example
[Surface Data]

| m | r | d | vd | nd | ng |
|---|---|---|---|---|---|
| OP | ∞ |  |  |  |  |
| 1) | 100.8418 | 1.20 | 42.73 | 1.834810 | 1.859557 |
| 2) | 12.6574 | 0.20 | 36.64 | 1.560930 | 1.580890 |
| *3) | 10.9951 | 7.05 |  |  |  |

TABLE 6-continued

Sixth Example
[Surface Data]

| m | r | d | vd | nd | ng |
|---|---|---|---|---|---|
| 4) | 21.4532 | 2.40 | 20.88 | 1.922860 | 1.982814 |
| 5) | 34.1160 | (d18) | | | |
| *6) | 14.6028 | 1.00 | 40.10 | 1.851348 | 1.878369 |
| 7) | 9.8130 | 3.50 | 52.33 | 1.755000 | 1.772953 |
| 8) | −124.9828 | 1.50 | | | |
| 9) (S) | ∞ | 1.80 | | | |
| 10) | 31.6130 | 0.70 | 32.32 | 1.953747 | 1.992060 |
| 11) | 11.2300 | 4.50 | 81.61 | 1.496997 | 1.504509 |
| 12) | −20.4731 | 1.20 | | | |
| *13) | 34.6235 | 0.90 | 45.45 | 1.801387 | 1.823574 |
| 14) | 18.4344 | (d14) | | | |
| *15) | −25.6503 | 1.00 | 45.45 | 1.801387 | 1.823574 |
| *16) | 390.0000 | (d16) | | | |
| 17) | −25.2964 | 1.50 | 32.32 | 1.953747 | 1.992060 |
| 18) | −32.1124 | 0.64 | | | |
| 19) | −1068.6691 | 4.20 | 35.25 | 1.910822 | 1.944117 |
| 20) | −34.4895 | (BF) | | | |
| I | ∞ | | | | |

[Aspherical Data]
Surface Number: 3
 K=0.0000
 C4=3.08194E−05
 C6=2.92185E−07
 C8=−3.02179E−09
 C10=9.34877E−12
Surface Number: 6
 K=1.0000
 C4=−3.64228E−05
 C6=−1.27201E−07
 C8=2.00483E−09
 C10=−3.50116E−11
Surface Number: 13
 K=1.0000
 C4=−6.42989E−05
 C6=−9.13900E−07
 C8=2.69556E−08
 C10=−7.03374E−10
Surface Number: 15
 K=1.0000
 C4=2.23810E−04
 C6=−8.52167E−06
 C8=1.38799E−07
 C10=−7.68675E−10
Surface Number: 16
 K=1.0000
 C4=2.33871E−04
 C6=−7.26776E−06
 C8=1.11301E−07
 C10=−6.25541E−10

[Various Data]

Variable magnification ratio 2.94

| | W | M | T |
|---|---|---|---|
| f | 16.48 | 35.00 | 48.50 |
| FNo | 3.70 | 5.59 | 6.81 |
| 2ω | 85.43 | 43.27 | 32.13 |
| Ymax | 14.20 | 14.20 | 14.20 |
| TL | 76.46 | 71.98 | 77.00 |
| BF | 9.56 | 9.56 | 9.56 |

[Variable Distance Data]

| | W | M | T |
|---|---|---|---|
| f | 16.48 | 35.00 | 48.50 |
| d5 | 23.90 | 6.32 | 2.00 |
| d14 | 5.30 | 9.97 | 12.52 |
| d16 | 4.41 | 12.84 | 19.09 |

[Lens Group Data]

| | ST | f |
|---|---|---|
| G1 | 1 | −24.38 |
| G2 | 6 | 18.89 |
| G3 | 15 | −30.00 |
| G4 | 17 | 50.67 |
| G2a | 6 | 18.50 |
| G2b | 10 | 68.10 |
| G2c | 13 | −50.44 |

[Values for Conditional Expressions]
 (1) f11/f1=0.640
 (2) f12/(−f1)=2.354
 (3) f22/ft=1.404
 (4) f21/ft=0.381
 (5) (−fγw)=1.230
 (6) f21/f22=0.272
 (7) (−f3)/fw=1.821
 (8) G2/TLt=0.196
 (9) G4/TLt=0.082
 (10) R2f3/R1f3=−15.205
 (11) (−f23)/ft=1.040
 (12) 2ω=85.430
 (13) Bfa/fw=0.580

FIGS. 12A and 12B are graphs showing various aberrations, respectively, in the wide angle end state and in the telephoto end state, of the variable magnification optical system according to the Sixth Example.

As is apparent from the respective graphs showing various aberrations, the variable magnification optical system relating to the present Example can correct superbly various aberrations over the wide angle end state to the telephoto end state and has excellent optical performance.

Seventh Example

Figure 13:
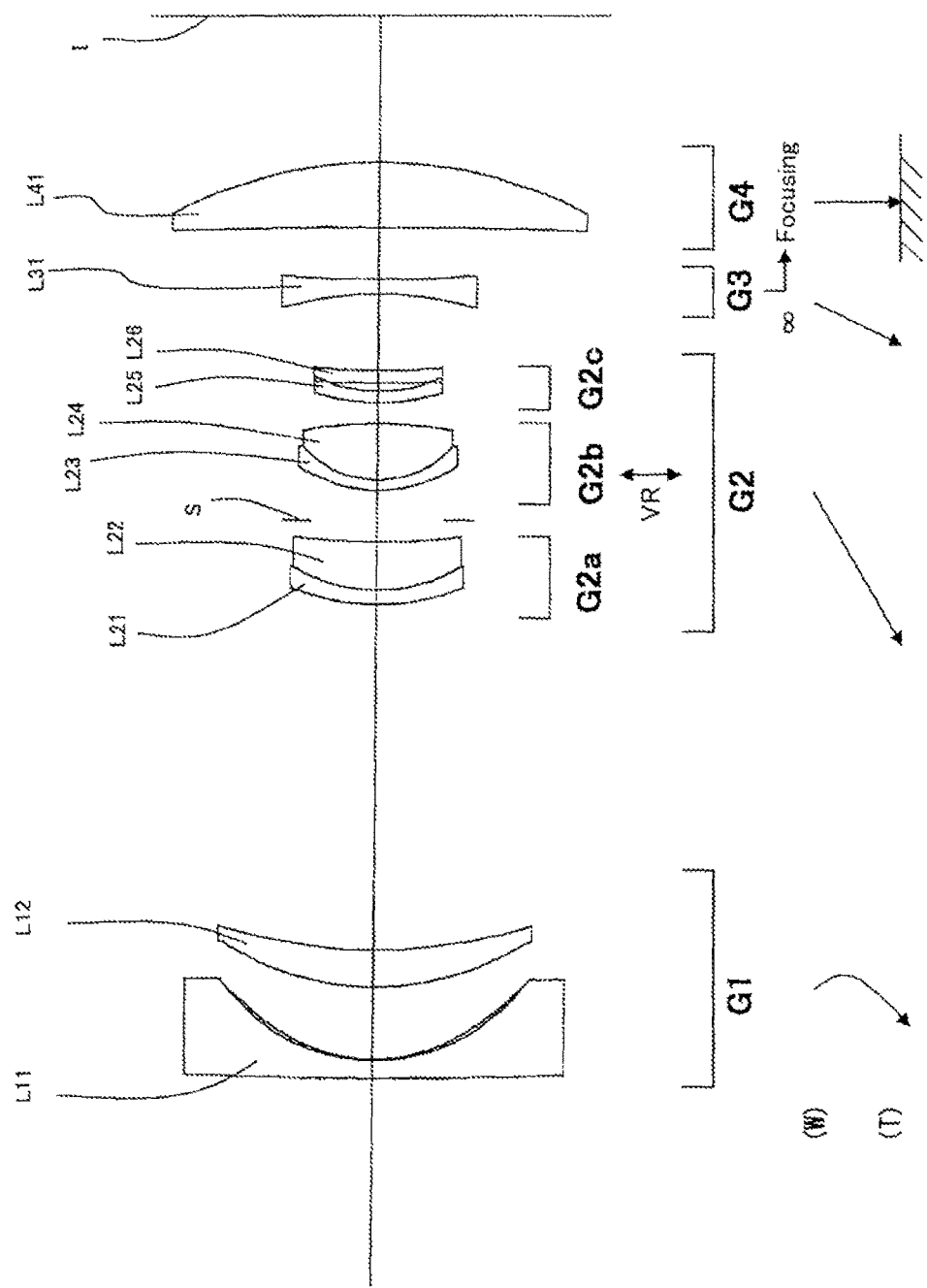
FIG. 13 is a sectional view in a wide angle end state, of a variable magnification optical system according to a Seventh Example.

FIG. 13 is a sectional view in the wide angle end state of a variable magnification optical system according to a Seventh Example.

The variable magnification optical system according to the present Example is composed of, in order from an object side, a first lens group G1 having negative refractive power, a second lens group G2 having positive refractive power, a third lens group G3 having negative refractive power, and a fourth lens group G4 having positive refractive power.

The first lens group G1 consists of, in order from the object side, a negative meniscus lens L11 having a convex surface facing an object side and a positive meniscus lens L12 having a convex surface facing an object side. The negative meniscus lens L11 is an aspherical lens whose image side glass lens surface is provided with aspherically shaped resin layer.

The second lens group G2 is composed of, in order from the object side, a 2a lens group G2a having positive refractive power, a 2b lens group G2b having positive refractive power and a 2c lens group G2c having negative refractive power. An aperture stop S is located between the 2a lens group G2a and the 2b lens group G2b of the second lens group.

The 2a lens group G2a consists of a cemented positive lens constructed by a negative meniscus lens L21 having a convex surface facing the object side cemented with a positive meniscus lens L22 having a convex surface facing the object side. The negative meniscus lens L21 is an aspherical lens whose object side lens surface is aspherically shaped.

The 2b lens group G2b consists of a cemented positive lens constructed by a negative meniscus lens L23 having a convex surface facing the object side cemented with a double convex positive lens L24.

The 2c lens group G2c consists of a negative meniscus lens L25 having a convex surface facing the object side and a negative meniscus lens L26 having a convex surface facing the object side. The negative meniscus lens L25 is an aspherical lens whose object side lens surface is aspherically shaped.

The third lens group G3 consists of a double concave negative lens L31. The negative lens L31 is an aspherical lens whose object side lens surface and image side lens surface are aspherically shaped.

The fourth lens group G4 consists of a positive meniscus lens L41 having a concave surface facing the object side.

On the image plane I, an imaging device (not shown) such as CCD, CMOS or the like is disposed.

In the variable magnification optical system according to the present Example having the above configuration, upon varying magnification from the wide angle end state to the telephoto end state, the first lens group G1, the second lens group G2 and the third lens group G3 are moved along the optical axis such that a distance between the first lens group G1 and the second lens group G2 is decreased, a distance between the second lens group G2 and the third lens group G3 is increased, and a distance between the third lens group G3 and the fourth lens group G4 is increased. In detail, the first lens group G1 is moved once to the image side and then to the object side, the second lens group G2 is moved to the object side, and the third lens group G3 is moved to the object side. Meanwhile, upon varying the magnification, the fourth lens group G4 is fixed with respect to the image plane I.

In the variable magnification optical system according to the present Example, focusing from an infinite distance object to a close distance object is carried out by moving the third lens group G3 along the optical axis toward the image side.

In the variable magnification optical system according to the present Example, correction of the image plane at the time when image blur occurs, that is, vibration reduction, is conducted by moving the 2b lens group G2b as a vibration reducing lens group to have a component in a direction perpendicular to the optical axis.

Table 7 below shows various values of the variable magnification optical system relating to the present Example.

TABLE 7

Seventh Example
[Surface Data]

| m | r | d | vd | nd | ng |
|---|---|---|----|----|----|
| OP | ∞ | | | | |
| 1) | 318.1940 | 1.2000 | 42.73 | 1.834810 | 1.859557 |
| 2) | 13.3339 | 0.1146 | 36.64 | 1.560930 | 1.580890 |
| *3) | 11.8585 | 4.9800 | | | |

TABLE 7-continued

Seventh Example
[Surface Data]

| m | r | d | vd | nd | ng |
|---|---|---|----|----|----|
| 4) | 20.3293 | 2.5326 | 20.88 | 1.922860 | 1.982814 |
| 5) | 36.1595 | (d5) | | | |
| *6) | 16.0234 | 1.0000 | 37.28 | 1.834410 | 1.863105 |
| 7) | 11.8242 | 3.3000 | 52.33 | 1.755000 | 1.772953 |
| 8) | 46.9472 | 1.5000 | | | |
| 9) (S) | ∞ | 2.1000 | | | |
| 10) | 10.4476 | 0.7000 | 32.32 | 1.953747 | 1.992060 |
| 11) | 7.2259 | 4.0000 | 81.61 | 1.496997 | 1.504509 |
| 12) | −29.7417 | 1.4000 | | | |
| *13) | 15.1738 | 0.8000 | 45.45 | 1.801387 | 1.823574 |
| 14) | 10.8696 | 0.6000 | | | |
| *15) | 151.5835 | 0.8000 | 47.35 | 1.788000 | 1.808889 |
| *16) | 48.2029 | (d16) | | | |
| 17) | −21.9436 | 1.0000 | 45.45 | 1.801387 | 1.823574 |
| 18) | 250.0319 | (d18) | | | |
| 19) | −412.1948 | 4.5000 | 32.32 | 1.953747 | 1.992060 |
| 20) | −31.6185 | (BF) | | | |
| I | ∞ | | | | |

[Aspherical Data]
Surface Number: 3
K=0.0000
C4=3.36194E−05
C6=6.64302E−08
C8=−5.94762E−10
C10=7.09446E−13
Surface Number: 6
K=1.0000
C4=−1.51373E−05
C6=−1.50803E−07
C8=2.94929E−09
C10=−4.78160E−11
Surface Number: 13
K=1.0000
C4=−8.76066E−05
C6=2.15101E−07
C8=−3.75172E−08
C10=1.39218E−09
Surface Number: 17
K=1.0000
C4=4.14606E−05
C6=2.35903E−07
C8=−2.11292E−08
C10=3.33497E−10
Surface Number: 18
K=1.0000
C4=7.60623E−05
C6=−2.20545E−07
C8=−8.35741E−09
C10=1.26712E−10

[Various Data]

Variable magnification ratio 2.95

| | W | M | T |
|---|---|---|---|
| f | 16.45 | 35.00 | 48.50 |
| FNO | 3.67 | 5.42 | 6.52 |
| 2ω | 86.08 | 42.51 | 31.54 |
| Ymax | 14.20 | 14.20 | 14.20 |
| TL | 73.45 | 69.38 | 73.24 |
| BF | 10.05 | 10.05 | 10.05 |

[Variable Distance Data]

|     | W     | M     | T     |
|-----|-------|-------|-------|
| f   | 16.45 | 35.00 | 48.50 |
| d5  | 23.92 | 6.72  | 2.05  |
| d16 | 5.33  | 10.92 | 14.92 |
| d18 | 3.62  | 11.16 | 15.15 |

[Lens Group Data]

|     | ST | f      |
|-----|----|--------|
| G1  | 1  | −25.63 |
| G2  | 6  | 18.70  |
| G3  | 17 | −25.13 |
| G4  | 19 | 35.70  |
| G2a | 6  | 31.95  |
| G2b | 10 | 22.24  |
| G2c | 13 | −33.00 |

[Values for Conditional Expressions]
 (1) f11/f1=0.599
 (2) f12/(−f1)=1.823
 (3) f22/ft=0.459
 (4) f21/ft=0.659
 (5) (−fγw)=1.180
 (6) f21/f22=1.437
 (7) (−f3)/fw=1.528
 (8) G2/TLt=0.221
 (9) G4/TLt=0.061
 (10) R2f3/R1f3=−11.394
 (11) (−f23)/ft=0.687
 (12) 2ω=86.080
 (13) Bfa/fw=0.611

FIGS. 14A and 14B are graphs showing various aberrations, respectively, in the wide angle end state and in the telephoto end state, of the variable magnification optical system according to the Seventh Example.

As is apparent from the respective graphs showing various aberrations, the variable magnification optical system relating to the present Example can correct superbly various aberrations over the wide angle end state to the telephoto end state and has excellent optical performance.

Eighth Example

Figure 15:
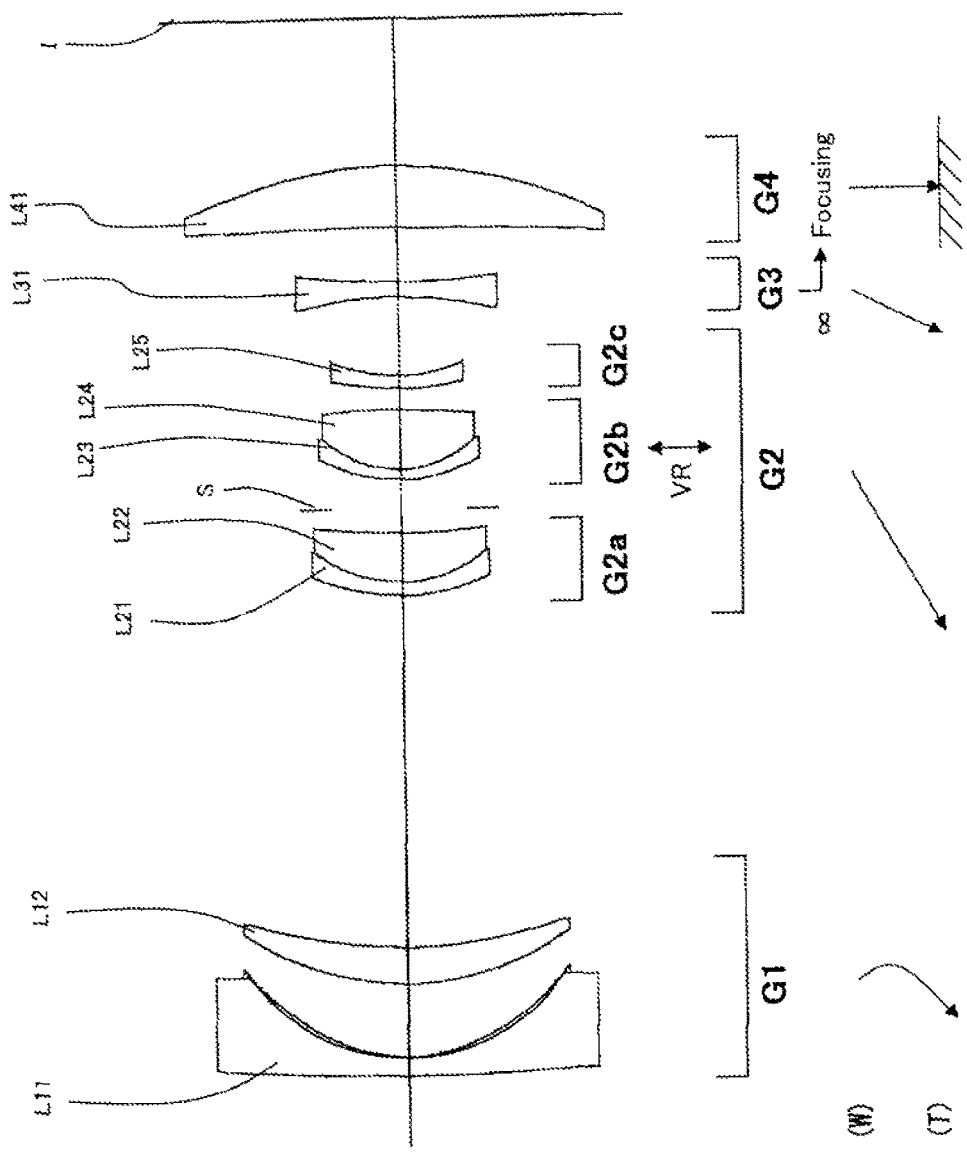
FIG. 15 is a sectional view in a wide angle end state, of a variable magnification optical system according to an Eighth Example.

FIG. 15 is a sectional view of a variable magnification optical system according to an Eighth Example.

The variable magnification optical system according to the present Example is composed of, in order from an object side, a first lens group G1 having negative refractive power, a second lens group G2 having positive refractive power, a third lens group G3 having negative refractive power, and a fourth lens group G4 having positive refractive power.

The first lens group G1 consists of, in order from the object side, a negative meniscus lens L11 having a convex surface facing an object side, and a positive meniscus lens L12 having a convex surface facing the object side. The negative meniscus lens L11 is an aspherical lens whose image side glass lens surface is provided with aspherically shaped resin layer.

The second lens group G2 is composed of, in order from the object side, a 2a lens group G2a having positive refractive power, a 2b lens group G2b having positive refractive power, and a 2c lens group G2c having negative refractive power. An aperture stop S is located between the 2a lens group G2a and the 2b lens group G2b of the second lens group.

The 2a lens group G2a consists of a cemented positive lens constructed by a negative meniscus lens L21 having a convex surface facing the object side cemented with a positive meniscus lens L22 having a convex surface facing the object side. The negative meniscus lens L21 is an aspherical lens whose object side lens surface is aspherically shaped.

The 2b lens group G2b consists of a cemented positive lens constructed by a negative meniscus lens L23 having a convex surface facing the object side cemented with a double convex positive lens L24.

The 2c lens group G2c consists of a negative meniscus lens L25 having a convex surface facing the object side. The negative meniscus lens L25 is an aspherical lens whose object side lens surface is aspherically shaped.

The third lens group G3 consists of a double concave negative lens L31. The negative lens L31 is an aspherical lens whose object side lens surface and image side lens surface are aspherically shaped.

The fourth lens group G4 consists of a positive meniscus lens L41 having a concave surface facing the object side.

On the image plane I, an imaging device (not shown) such as CCD, CMOS or the like is disposed.

In the variable magnification optical system according to the present Example having the above configuration, upon varying magnification from the wide angle end state to the telephoto end state, the first lens group G1, the second lens group G2 and the third lens group G3 are moved along the optical axis such that a distance between the first lens group G1 and the second lens group G2 is decreased, a distance between the second lens group G2 and the third lens group G3 is increased, and a distance between the third lens group G3 and the fourth lens group G4 is increased. In detail, the first lens group G1 is moved once to the image side and then to the object side, the second lens group G2 is moved to the object side, and the third lens group G3 is moved to the object side. Meanwhile, upon varying the magnification, the fourth lens group G4 is fixed with respect to the image plane I.

In the variable magnification optical system according to the present Example, focusing from an infinite distance object to a close distance object is carried out by moving the third lens group G3 along the optical axis toward the image side.

In the variable magnification optical system according to the present Example, correction of the image plane at the time when image blur occurs, that is, vibration reduction, is conducted by moving the 2b lens group G2b as a vibration reducing lens group to have a component in a direction perpendicular to the optical axis.

Table 8 below shows various values of the variable magnification optical system relating to the present Example.

TABLE 8

Eighth Example
[Surface Data]

| m   | r        | d    | vd    | nd       | ng       |
|-----|----------|------|-------|----------|----------|
| OP  | ∞        |      |       |          |          |
| 1)  | 164.2409 | 1.20 | 42.73 | 1.834810 | 1.859557 |
| 2)  | 13.2012  | 0.12 | 36.64 | 1.560930 | 1.580890 |
| *3) | 11.5762  | 4.97 |       |          |          |

TABLE 8-continued

Eighth Example
[Surface Data]

| m | r | d | vd | nd | ng |
|---|---|---|---|---|---|
| 4) | 19.9548 | 2.43 | 20.88 | 1.922860 | 1.982810 |
| 5) | 34.9021 | (d5) | | | |
| *6) | 14.5813 | 0.90 | 37.28 | 1.834410 | 1.863100 |
| 7) | 9.2500 | 3.36 | 52.34 | 1.755000 | 1.772953 |
| 8) | 52.3705 | 1.60 | | | |
| 9) (S) | ∞ | 2.00 | | | |
| 10) | 11.1735 | 0.70 | 32.33 | 1.953750 | 1.992059 |
| 11) | 7.6414 | 4.00 | 81.61 | 1.497000 | 1.504510 |
| 12) | −45.2316 | 1.40 | | | |
| *13) | 19.2894 | 0.90 | 45.25 | 1.795256 | 1.817388 |
| 14) | 11.9890 | (d14) | | | |
| *15) | −29.6878 | 1.00 | 45.46 | 1.801390 | 1.823570 |
| *16) | 56.3004 | (d16) | | | |
| 17) | −345.3773 | 4.20 | 32.33 | 1.953750 | 1.992059 |
| 18) | −32.7802 | (BF) | | | |
| I | ∞ | | | | |

[Aspherical Data]
Surface Number: 3
  K=0.0000
  C4=3.80785E-05
  C6=3.24996E-08
  C8=−7.75872E-11
  C10=−1.57872E-12
Surface Number: 6
  K=1.0000
  C4=−1.40463E-05
  C6=−4.76006E-08
  C8=2.18077E-10
  C10=−1.70904E-11
Surface Number: 13
  K=1.0000
  C4=−8.28392E-05
  C6=−8.50079E-07
  C8=1.22452E-08
  C10=−3.42932E-11
Surface Number: 15
  K=1.0000
  C4=−1.28382E-04
  C6=4.23515E-06
  C8=−9.86336E-08
  C10=1.12907E-09
Surface Number: 16
  K=1.0000
  C4=−8.33049E-05
  C6=3.48272E-06
  C8=−6.94588E-08
  C10=6.14665E-10

[Various Data]

Variable magnification ratio 2.95

| | W | M | T |
|---|---|---|---|
| f | 16.46 | 35.04 | 48.50 |
| FNo | 3.56 | 5.35 | 6.36 |
| 2ω | 84.69 | 42.54 | 31.81 |
| Ymax | 14.20 | 14.20 | 14.20 |
| TL | 71.75 | 66.94 | 71.27 |
| BF | 10.05 | 10.05 | 10.05 |

[Variable Distance Data]

| | W | M | T |
|---|---|---|---|
| f | 16.46 | 35.04 | 48.50 |
| d5 | 23.92 | 6.40 | 2.00 |
| d14 | 5.34 | 10.17 | 13.02 |
| d16 | 3.66 | 11.54 | 16.92 |

[Lens Group Data]

| | ST | f |
|---|---|---|
| G1 | 1 | −26.32 |
| G2 | 6 | 18.31 |
| G3 | 15 | −24.13 |
| G4 | 17 | 37.73 |
| G2a | 6 | 27.61 |
| G2b | 10 | 26.84 |
| G2c | 13 | −42.13 |

[Values for Conditional Expressions]
(1) f11/f1=0.594
(2) f12/(−f1)=1.779
(3) f22/ft=0.553
(4) f21/ft=0.569
(5) (−fγw)=1.250
(6) f21/f22=1.029
(7) (−f3)/fw=1.466
(8) G2/TLt=0.208
(9) G4/TLt=0.059
(10) R2f3/R1f3=−1.896
(11) (−f23)/ft=0.869
(12) 2ω=84.690
(13) Bfa/fw=0.638

FIGS. 16A and 16B are graphs showing various aberrations, respectively, in the wide angle end state and in the telephoto end state, of the variable magnification optical system according to the Eighth Example.

As is apparent from the respective graphs showing various aberrations, the variable magnification optical system relating to the present Example can correct superbly various aberrations over the wide angle end state to the telephoto end state and has excellent optical performance.

According to each of the above described Examples, it is possible to realize a variable magnification optical system which can correct superbly various aberrations over the wide angle end state to the telephoto end state and has excellent optical performance, and which is made to be small in size.

Meanwhile, it is noted that each of the above described Examples is a concrete example of the invention of the present application, and the invention of the present application is not limited to them. The contents described below can be adopted without deteriorating optical performance of the variable magnification optical systems according to the present embodiment.

Although variable magnification optical systems having a four group configuration were illustrated above as numerical examples of the variable magnification optical systems according to the present embodiment, the present embodiment is not limited to them and variable magnification optical systems having other configurations, such as a five group configuration, or the like, can be configured. Concretely, a lens configuration that a lens or a lens group is added to the most object side or the most image side of the variable magnification optical system according to the each of the above described Examples is possible. Alternatively, a lens or a lens group may be added between the neighboring lens groups.

Further, in each of the above described Examples, focusing lens group was the third lens group, but Auto focusing can be applied for such focusing group, and drive by motor for auto focusing, such as, ultrasonic motor, stepping motor, VCM motor or the like may be suitably adopted.

Further, in the variable magnification optical systems according to each of the above described Examples, vibration reduction lens group was the 2b lens group, but any lens group as a whole or a portion thereof can be moved to have a component in a direction perpendicular to the optical axis as a vibration reduction lens group, or rotationally moved (swayed) in an in-plane direction including the optical axis, whereby a configuration of a vibration reduction is can be taken.

Further, in each of the above described Examples, the aperture stop may be substituted by a lens frame without disposing a member as an aperture stop.

Further, in the variable magnification optical systems according to each of the above described Examples, a lens surface of a lens may be a spherical surface, a plane surface, or an aspherical surface. When a lens surface is a spherical surface or a plane surface, lens processing, assembling and adjustment become easy, and it is possible to prevent deterioration in optical performance caused by lens processing, assembling and adjustment errors, so that it is preferable. Moreover, even if an image plane is shifted, deterioration in depiction performance is little, so that it is preferable. When a lens surface is an aspherical surface, the aspherical surface may be fabricated by a grinding process, a glass molding process that a glass material is formed into an aspherical shape by a mold, or a compound type process that a resin material is formed into an aspherical shape on a glass lens surface. A lens surface may be a diffractive optical surface, and a lens may be a graded-index lens (GRIN lens) or a plastic lens.

Moreover, the lens surface(s) of the lenses configuring the variable magnification optical systems according to each of the above described Examples, may be coated with anti-reflection coating(s) having a high transmittance in a wide wavelength region. With this contrivance, it is feasible to reduce a flare as well as ghost and attain excellent optical performance with high contrast.

Figure 17:
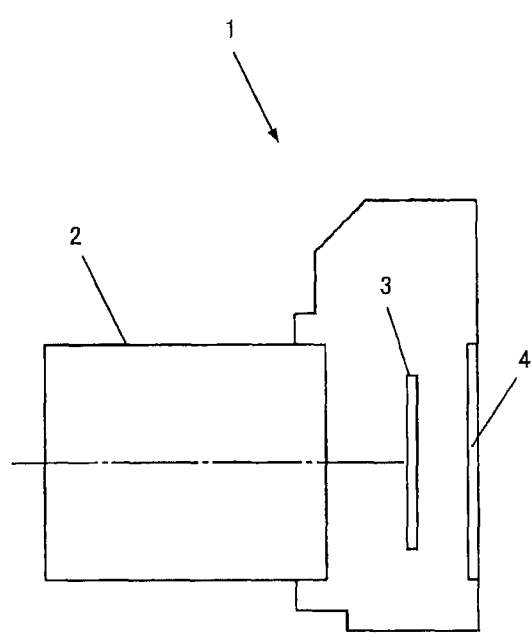
FIG. 17 is a view showing a configuration of a camera equipped with the variable magnification optical system.

Next, a camera equipped with the variable magnification optical system according to the present embodiment, will be explained with referring to FIG. 17. FIG. 17 is a view showing a configuration of the camera equipped with the variable magnification optical system according to the present embodiment. The camera 1 shown in FIG. 17, is a mirror-less camera of a lens interchangeable type equipped with the variable magnification optical system according to the First Example as an imaging lens 2.

In the present camera 1, a light emitted from an unillustrated object (an object to be photo-taken) is converged by the imaging lens 2, through a unillustrated OLPF (Optical low pass filter), and forms an image of the object on an imaging plane of an image pick-up portion 3. The light from the object is photo-electrically converted through a photoelectric conversion element provided on the image pick-up portion 3 to form a picture image of the object. This picture image is displayed on an EVF (electric view finder) 4 provided on the camera 1. Accordingly, a photographer can observe the picture image of the object to be photo-taken through the EVF 4.

Further, upon unillustrated release button being depressed by the photographer, the picture image of the object formed by the image pick-up portion 3 is stored in an unillustrated memory. Thus, the photographer can take a photo of the object by the camera 1.

It is noted here that the variable magnification optical system relating to the First Example which is mounted on the present camera 1 as the imaging lens 2, has superb optical performance that can correct superbly various aberrations over the wide angle end state to the telephoto end state as described above and is made to be small in size. In other words, the camera 1 can realize high optical performance that can correct superbly various aberrations, and can be made small in size.

Incidentally, when there is configured a camera in which the variable magnification optical system according to any of the before-mentioned Second to Eighth Examples is installed as the imaging lens 2, the camera also can have the same effects as those of the above-mentioned camera 1. Further, even when the variable magnification optical system according to any of the Examples is installed in a camera of a single lens reflex type equipped with a quick return mirror in which the object image is observed through a finder optical system, the camera also can have the same effects as those of the above-mentioned camera 1.

Figure 18:
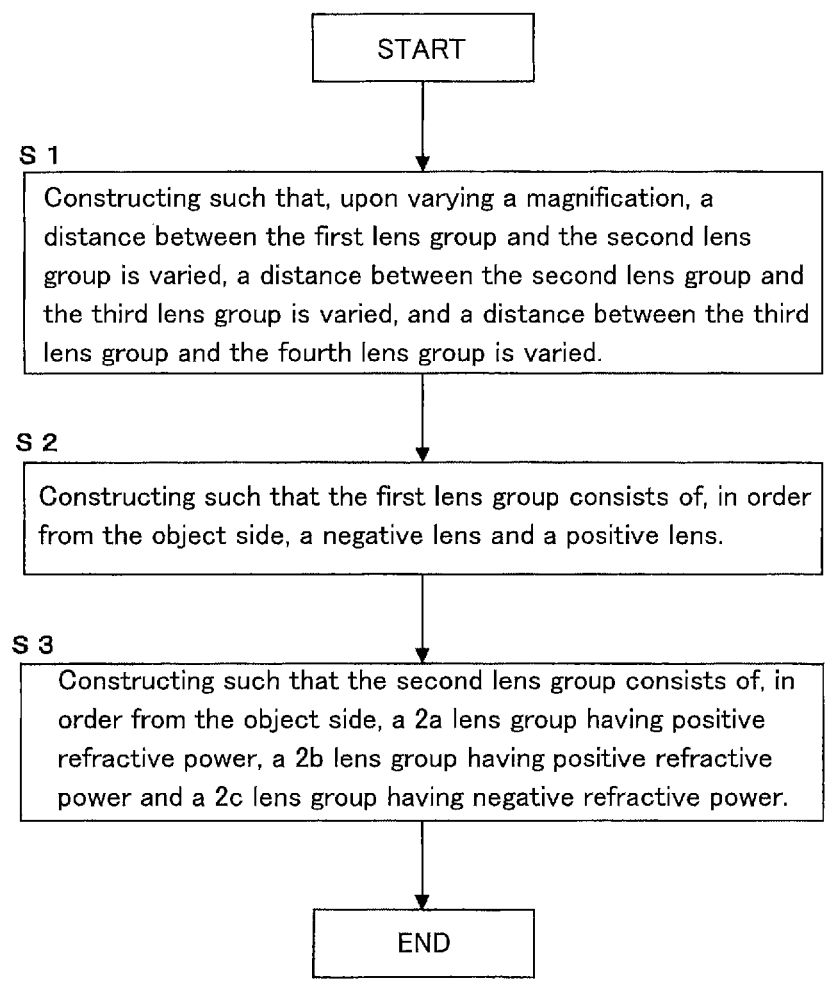
FIG. 18 is a flowchart schematically showing a method for manufacturing the variable magnification optical system.

Next, an outline of a method for manufacturing the variable magnification optical system according to the present embodiment, is described with referring to FIG. 18. FIG. 18 is a flowchart schematically showing a method for manufacturing the variable magnification optical system.

The method for manufacturing the variable magnification optical system according to the present embodiment shown in FIG. 18, is a method for manufacturing a variable magnification optical system which comprises, in order from an object side, a first lens group having negative refractive power, a second lens group having positive refractive power, a third lens group having negative refractive power, and a fourth lens group having positive refractive power; the method comprising the following steps S1 to S3.

Step S1: constructing such that, upon varying magnification, a distance between said first lens group and said second lens group is varied, a distance between said second lens group and said third lens group is varied, and a distance between the third lens group and the fourth lens group is varied.

Step S2: constructing such that, the first lens group consists of, in order from the object side, a negative lens and a positive lens.

Step S3: constructing such that the second lens group consists of, in order from the object side, a 2a lens group having positive refractive power, a 2b lens group having positive refractive power and a 2c lens group having negative refractive power.

According to the above-stated method for manufacturing the variable magnification optical system according to the present embodiment, it is possible to realize a variable magnification optical system which has high optical performance that can correct superbly various aberrations and which is downsized.

EXPLANATION OF REFERENCE SYMBOLS

G1 first lens group
G2 second lens group
G3 third lens group
G4 fourth lens group
G2a 2a lens group G2b 2b lens group
G2c 2c lens group
S aperture stop
I image plane
1 camera
2 imaging lens

What is claimed is:

1. A variable magnification optical system comprising, in order from an object side, a first lens group having negative refractive power, a second lens group having positive refractive power, a third lens group having negative refractive power and a fourth lens group having positive refractive power;
   upon varying a magnification, a distance between the first lens group and the second lens group being varied, a distance between the second lens group and the third lens group being varied, and a distance between the third lens group and the fourth lens group being varied;
   the first lens group consisting of, in order from the object side, a negative lens and a positive lens;
   the second lens group consisting of, in order from the object side, a 2a lens group having positive refractive power, a 2b lens group having positive refractive power, and a 2c lens group having negative refractive power; and
   the following conditional expression being satisfied:

$0.50<(-f3)/fw<3.00$ where f3 denotes a focal length of the third lens group, and fw denotes a focal length of the variable magnification optical system as a whole in the wide angle end state.

2. A variable magnification optical system according to claim 1, wherein image blur is corrected by moving the 2b lens group to have a component in a direction perpendicular to the optical axis.

3. A variable magnification optical system according to claim 1, wherein the third lens group is moved in the direction of the optical axis upon carrying out focusing.

4. A variable magnification optical system according to claim 1, wherein
   the following conditional expression is satisfied:

$0.10<f11/f1<1.20$ where f11 denotes a focal length of the negative lens, and f1 denotes a focal length of the first lens group.

5. A variable magnification optical system according to claim 1, wherein
   the following conditional expression is satisfied:

$0.50<f12/(-f1)<4.00$ where f12 denotes a focal length of the positive lens, and f1 denotes a focal length of the first lens group.

6. A variable magnification optical system according to claim 1, wherein the following conditional expression is satisfied:

$0.200<f22/ft<1.700$ where f22 denotes a focal length of the 2b lens group, and ft denotes a focal length of the variable magnification optical system as a whole in the telephoto end state.

7. A variable magnification optical system according to claim 1, wherein
   the following conditional expression is satisfied:

$0.150<f21/ft<2.000$ where f21 denotes a focal length of the 2a lens group, and ft denotes a focal length of the variable magnification optical system as a whole in the telephoto end state.

8. A variable magnification optical system according to claim 1, wherein the 2a lens group consists of a cemented lens.

9. A variable magnification optical system according to claim 1, wherein the 2b lens group consists of a cemented lens.

10. A variable magnification optical system according to claim 1, wherein, upon carrying out focusing, the third lens group is moved in the direction of the optical axis and the following conditional expression is satisfied:

$1.00<(-f\gamma w)<2.00$ where fγw denotes a ratio of an amount of movement of the image plane to an amount of movement of the third lens group in the wide angle end state.

11. A variable magnification optical system according to claim 1, wherein the following conditional expression is satisfied:

$0.05<f21/f22<3.00$ where f21 denotes a focal length of the 2a lens group, and f22 denotes a focal length of the 2b lens group.

12. A variable magnification optical system according to claim 1, wherein the following conditional expression is satisfied:

$0.100<G2/TLt<0.500$ where G2 denotes a length on the optical axis of the second lens group, and TLt denotes a length on the optical axis of the variable magnification optical system as a whole in the telephoto end state.

13. A variable magnification optical system according to claim 1, wherein the following conditional expression is satisfied:

$0.020<G4/TLt<0.200$ where G4 denotes a length on the optical axis of the fourth lens group, and TLt denotes a length on the optical axis of the variable magnification optical system as a whole in the telephoto end state.

14. A variable magnification optical system according to claim 1, wherein
    the third lens group consists of a lens component, and the following conditional expression is satisfied:

$-20.00<R2f3/R1f3<-1.00$ where R1f3 denotes a radius of curvature of a most object side lens surface of the lens component, and R2f3 denotes a radius of curvature of a most image side lens surface of the lens component.

15. A variable magnification optical system according to claim 1, wherein the third lens group has at least one aspherical surface.

16. A variable magnification optical system according to claim 1, wherein the following conditional expression is satisfied:

$-16.00<(-f23)/ft<5.00$ where f23 denotes a focal length of the 2c lens group, and ft denotes a focal length of the variable magnification optical system as a whole in the telephoto end state.

17. A variable magnification optical system according to claim 1, wherein the following conditional expression is satisfied:

$50.0°<2\omega<120.0°$ where 2ω denotes an entire angle of view of the variable magnification optical system in the wide angle end state.

18. A variable magnification optical system according to claim 1, wherein the following conditional expression is satisfied:

$$0.20 < Bfa/fw < 0.90$$

where Bfa denotes an air converted back focus of the variable magnification optical system as a whole in the wide angle end state, and fw denotes a focal length of the variable magnification optical system as a whole in the wide angle end state.

19. An optical equipment equipped with a variable magnification optical system according to claim 1.

20. A method for manufacturing a variable magnification optical system comprising, in order from an object side, a first lens group having negative refractive power, a second lens group having positive refractive power, a third lens group and a fourth lens group, the method comprising the steps of:

constructing such that, upon varying a magnification, a distance between the first lens group and the second lens group is varied, a distance between the second lens group and the third lens group is varied, and a distance between the third lens group and the fourth lens group is varied; and constructing such that at least one of the following features (A) or (B) is provided:

(A) the third lens group has negative refractive power and the fourth lens group has positive refractive power;
the first lens group consists of, in order from the object side, a negative lens and a positive lens;
the second lens group consists of, in order from the object side, a 2a lens group having positive refractive power, a 2b lens group having positive refractive power, and a 2c lens group having negative refractive power; and
the following conditional expression is satisfied:

$$0.50 < (-f3)/fw < 3.00$$

where f3 denotes a focal length of the third lens group, and fw denotes a focal length of the variable magnification optical system as a whole in the wide angle end state;

(B) the first lens group comprises a negative lens and a positive lens;
the second lens group consists of, in order from the object side, a 2a lens group having positive refractive power, a 2b lens group and a 2c lens group;
the 2a lens group consists of one lens component;
the 2b lens group consists of a cemented lens constructed by a negative lens cemented with a positive lens;
the 2c lens group consists of one lens component; and
the following conditional expressions are satisfied:

$$1.40 < f12/(-f1) < 2.80$$

$$0.185 < G2/TLt < 0.500$$

$$80.0° < 2ω < 110.0°$$

where f12 denotes a focal length of the positive lens of the first lens group, f1 denotes a focal length of the first lens group, G2 denotes a length on the optical axis of the second lens group, TLt denotes a length on the optical axis of the variable magnification optical system as a whole in the telephoto end state and 2ω denotes an entire angle of view of the variable magnification optical system in the wide angle end state.

21. A variable magnification optical system comprising, in order from an object side, a first lens group having negative refractive power, a second lens group having positive refractive power, a third lens group and a fourth lens group;

upon varying a magnification, a distance between the first lens group and the second lens group being varied, a distance between the second lens group and the third lens group being varied, and a distance between the third lens group and the fourth lens group being varied;

the first lens group comprising a negative lens and a positive lens;

the second lens group consisting of, in order from the object side, a 2a lens group having positive refractive power, a 2b lens group and a 2c lens group;

the 2a lens group consisting of one lens component;

the 2b lens group consisting of a cemented lens constructed by a negative lens cemented with a positive lens; and the 2c lens group consisting of one lens component;

wherein the following conditional expressions are satisfied:

$$1.40 < f12/(-f1) < 2.80$$

$$0.185 < G2/TLt < 0.500$$

$$80.0° < 2ω < 110.0°$$

where f12 denotes a focal length of the positive lens of the first lens group, f1 denotes a focal length of the first lens group, G2 denotes a length on the optical axis of the second lens group, TLt denotes a length on the optical axis of the variable magnification optical system as a whole in the telephoto end state and 2ω denotes an entire angle of view of the variable magnification optical system in the wide angle end state.

22. A variable magnification optical system according to claim 21, wherein the following conditional expression is satisfied:

$$0.50 < (-f3)/fw < 3.00$$

where f3 denotes a focal length of the third lens group, and fw denotes a focal length of the variable magnification optical system as a whole in the wide angle end state.

23. A variable magnification optical system according to claim 21, wherein the following conditional expression is satisfied:

$$0.20 < Bfa/fw < 0.90$$

where Bfa denotes an air converted back focus of the variable magnification optical system as a whole in the wide angle end state, and fw denotes a focal length of the variable magnification optical system as a whole in the wide angle end state.

* * * * *